(12) United States Patent
Botchev

(10) Patent No.: US 6,917,955 B1
(45) Date of Patent: Jul. 12, 2005

(54) FFT PROCESSOR SUITED FOR A DMT ENGINE FOR MULTICHANNEL CO ADSL APPLICATION

(75) Inventor: Vladimir Botchev, Nashua, NH (US)

(73) Assignee: Analog Devices, Inc., Norwood, MA (US)

( * ) Notice: Subject to any disclaimer, the term of this patent is extended or adjusted under 35 U.S.C. 154(b) by 556 days.

(21) Appl. No.: 10/132,011

(22) Filed: Apr. 25, 2002

(51) Int. Cl.⁷ .............................................. G06F 17/14
(52) U.S. Cl. ..................................... 708/406; 708/404
(58) Field of Search .................................. 708/404, 406

(56) References Cited

U.S. PATENT DOCUMENTS

| | | | | |
|---|---|---|---|---|
| 3,702,393 A | * | 11/1972 | Fuss | 708/404 |
| 3,746,848 A | * | 7/1973 | Clary | 708/404 |
| 3,892,956 A | * | 7/1975 | Fuss | 708/406 |
| 4,241,411 A | * | 12/1980 | Krasner et al. | 708/404 |
| 4,534,009 A | | 8/1985 | McGee | |
| 5,038,311 A | * | 8/1991 | Monastra et al. | 708/406 |
| 6,081,821 A | | 6/2000 | Hopkinson et al. | |

OTHER PUBLICATIONS

"Rapid Design of Application Specific FFT Cores"; by Ding et al., IEEE Transactions on Signal Processing, vol. 47, No. 5, May 1999; pp. 1371–1381.

"A Fast Fourier Transform Algorithm for Real–Valued Series"; by Glenn D. Bergland, Communications of the ACM, vol. 11, No. 10, Oct. 1968, pp. 703–710.

\* cited by examiner

*Primary Examiner*—D. H. Malzahn
(74) *Attorney, Agent, or Firm*—Gauthier & Connors, LLP

(57) ABSTRACT

A real-valued FFT processor implements Bergland's real-valued FFT and uses unique interstage switching/delay modules to reduce pipeline latency. Modified hybrid floating point arithmetic is also employed to provide maximum SNR. The real-valued FFT processor is particularly suited for a DMT engine and, in a multichannel CO ADSL application, the DMT engine can be multiplexed between the channels to provide an economic, low cost CO solution.

7 Claims, 21 Drawing Sheets

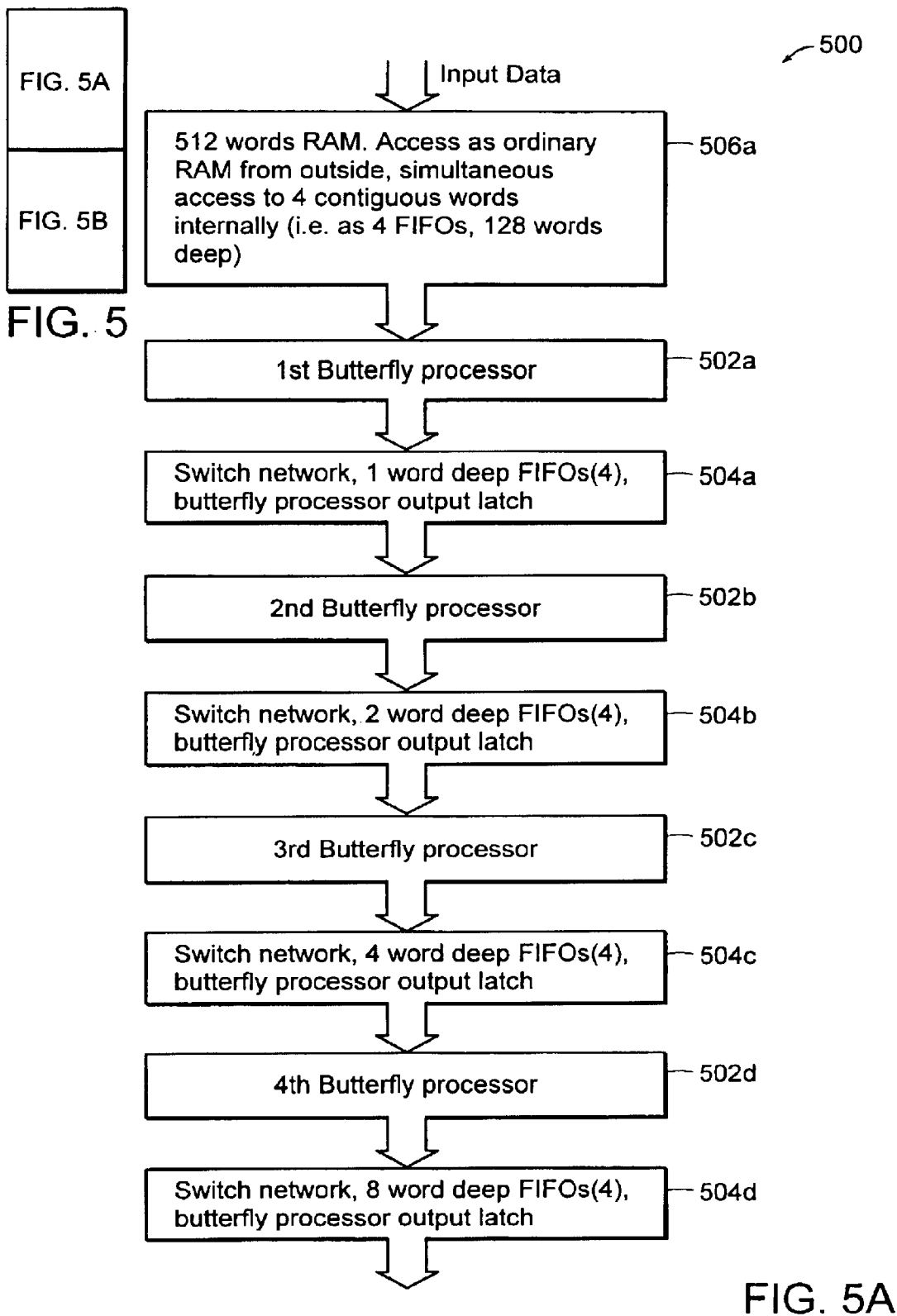

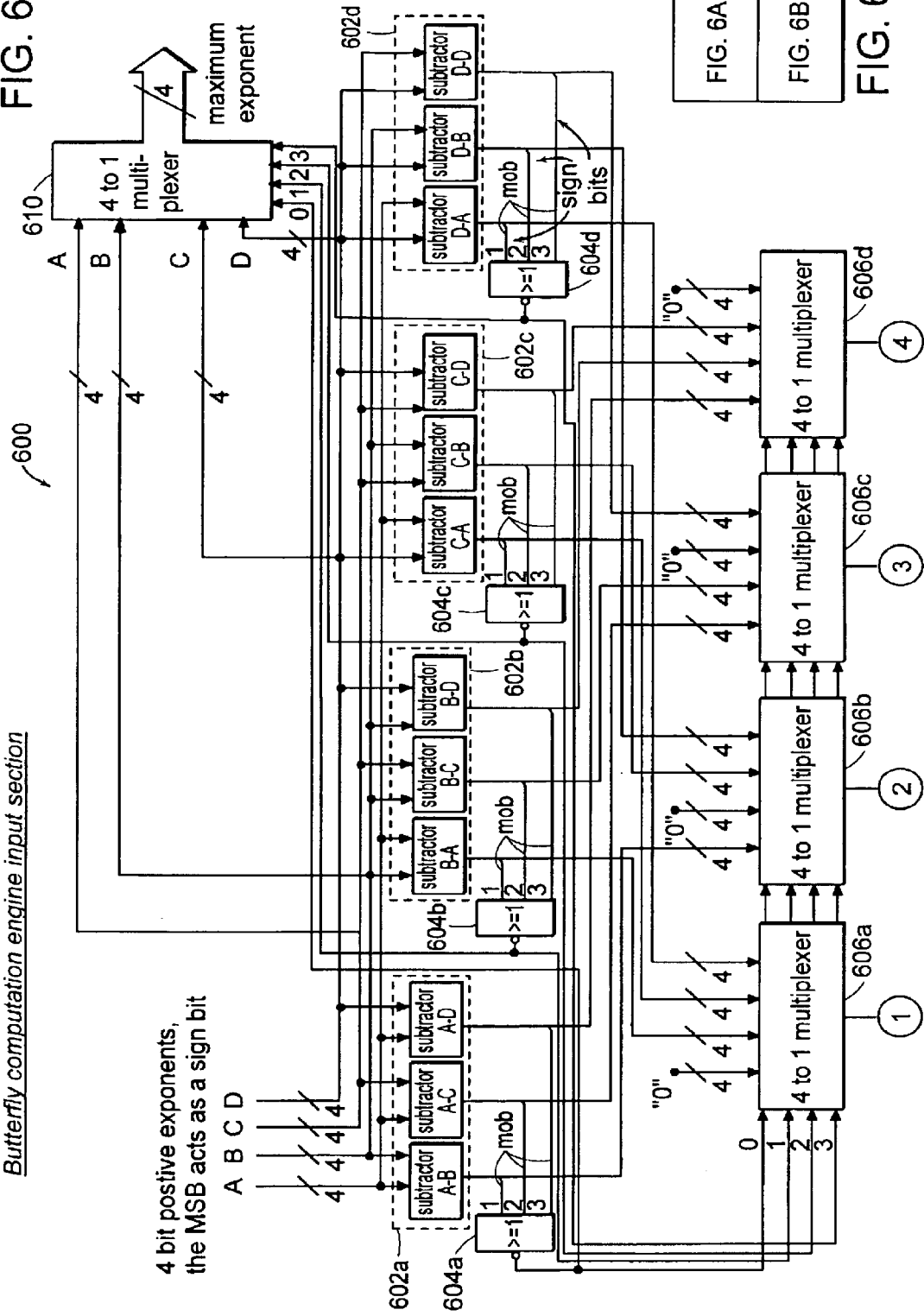

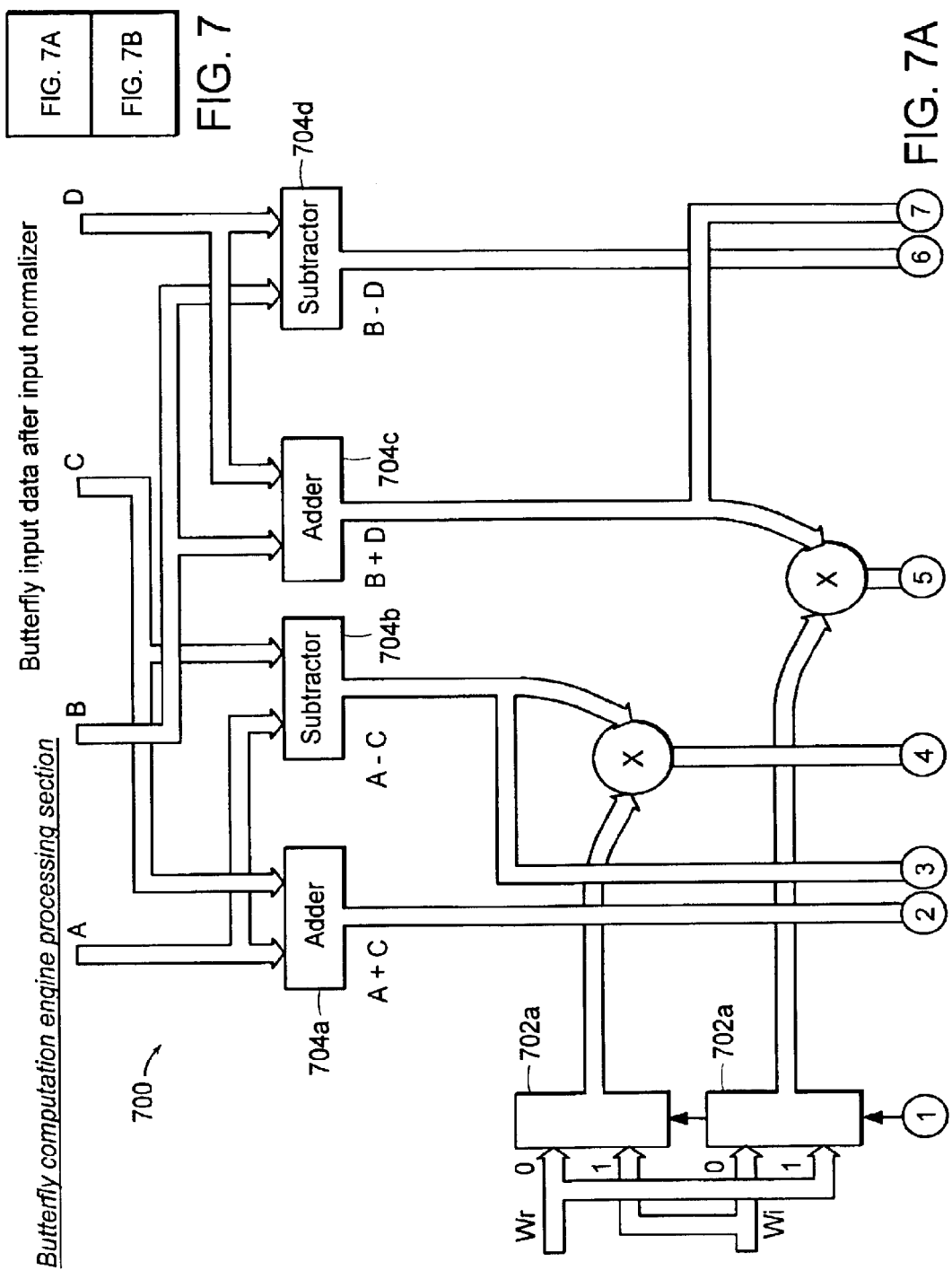

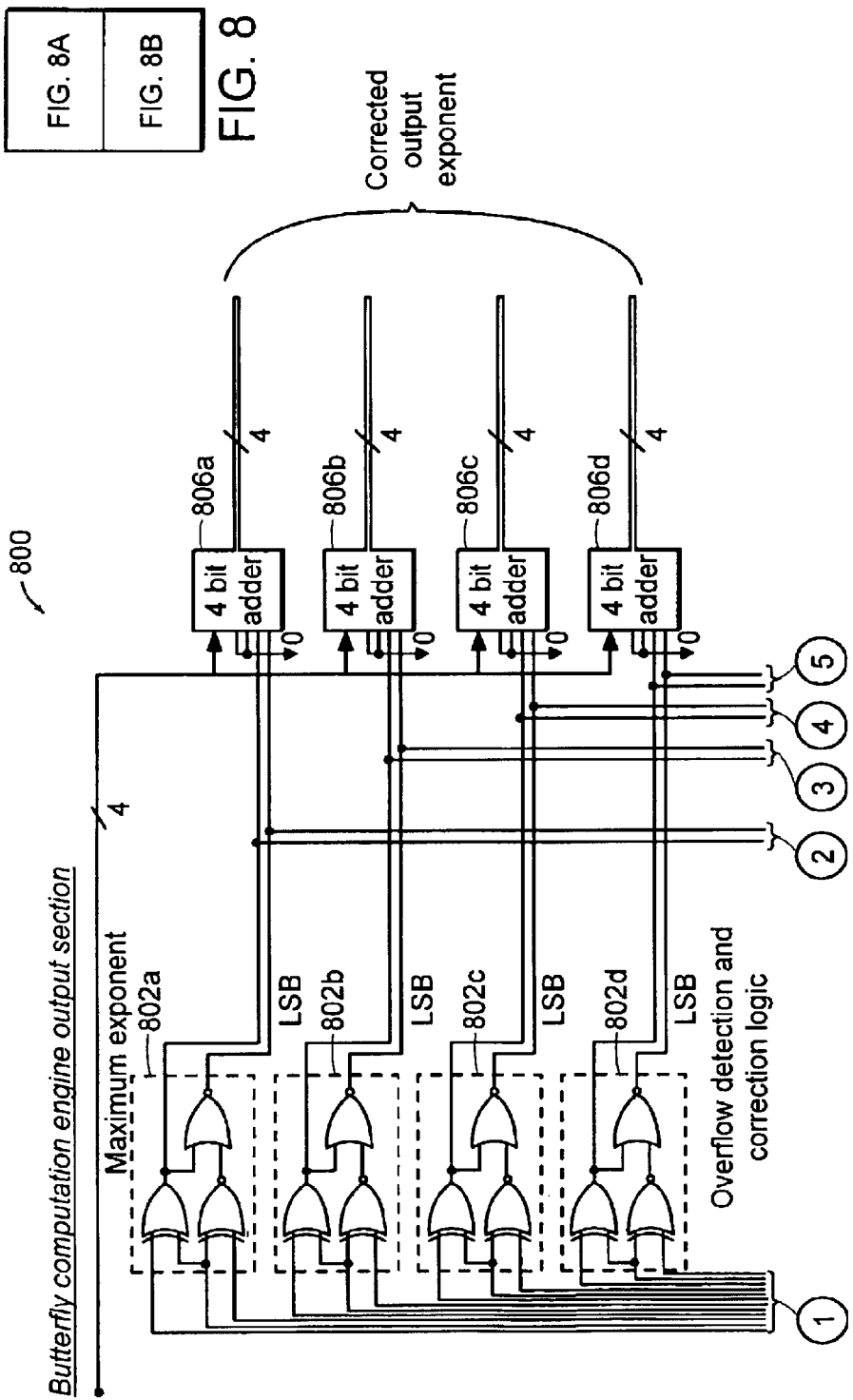

|   | Inputs | Delays | Outputs |   |
|---|---|---|---|---|
| 1 | 0<br>1<br>2<br>3 | | | |
| 2 | 4<br>5<br>6<br>7 | 0<br>2<br>1<br>3 | | position a |
| 3 | 8<br>9<br>10<br>11 | 1<br>3<br>5<br>7 | 0<br>2<br>4<br>6 | position b |
| 4 | 12<br>13<br>14<br>15 | 8<br>10<br>9<br>11 | 1<br>3<br>5<br>7 | position a |
| 5 | 16<br>17<br>18<br>19 | 9<br>11<br>13<br>15 | 8<br>10<br>12<br>14 | position b |

FIG. 9C

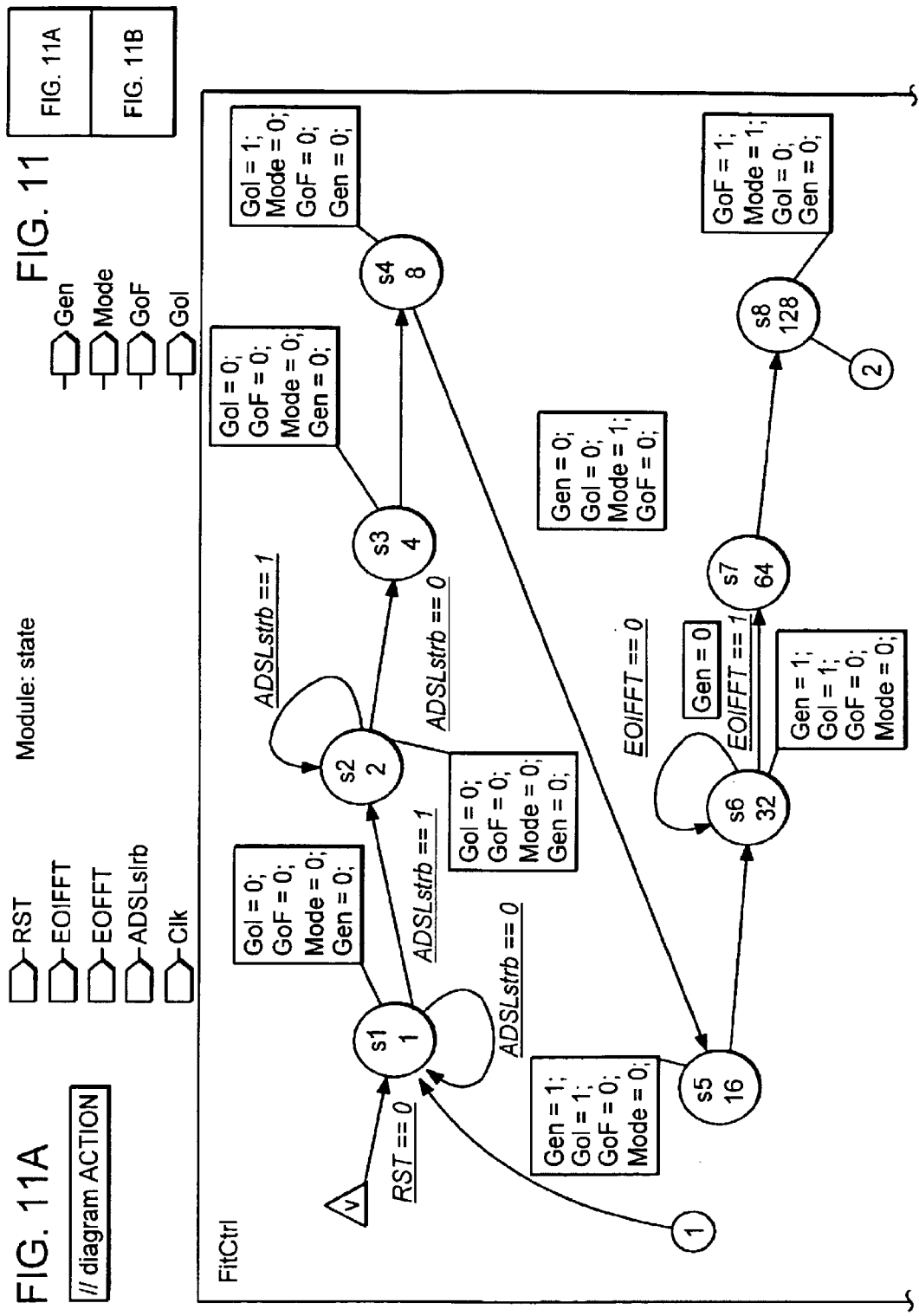

FFT PROCESSOR SUITED FOR A DMT ENGINE FOR MULTICHANNEL CO ADSL APPLICATION

BACKGROUND OF THE INVENTION

The invention relates generally to an FFT processor particularly suited for Discrete Multitone (DMT) processing, and in particular, to a very high-speed DMT engine that is multiplexed between the channels in a multichannel central office asymmetric digital subscriber line (CO ADSL) application.

CDSL DMT is at the core of digital subscriber line (DSL) modems. In a multichannel CO ADSL application, a DMT engine does the core processing. Each channel must have a DMT engine or a very fast DMT engine has to be multiplexed among the channels. The DMT signal is produced in the transmitter and is formally obtained by summing pairs of orthogonal sine/cosine waves, each pair having frequency different from all other pairs in the sum. Sine and cosine waves in each pair are amplitude modulated by the data item corresponding to that pair (also called tone). When the frequencies of the tones are harmonically related, as is usually the case, the most natural and easy way to generate the DMT signal is by means of an Inverse Discrete Fourier Transform, itself almost always executed with a FFT type of algorithm to substantially reduce the amount of computations performed. The DMT signal is real valued (as opposed to complex valued) so the IFFT input is conjugate symmetric. Since in a conjugate symmetric data block, half of the data is redundant (one half can be obtained from the other half by negating the imaginary part) the size of the IFFT used can be half of that usually required. This comes with a price, however, in the form of a special formatting of the data before the IFFT, called pretwiddling pass, which involves multiplications by twiddle factors and grouping. A Forward FFT performs demodulation of the DMT signal in the receiver. Here again, since the input to the Forward FFT is real valued, a half-size FFT algorithm can be used, with the price paid being the so-called post twiddling computation on the result of the Forward FFT.

Proposals have been made for more effectively producing the DMT sum of sine/cosine pairs. Some use transforms to speed up the FFT, e.g. FFT through Walsh Transform, while others have used combinations of sine and cosine transforms which are inherently real, e.g. Hartley transform or similar real valued FFTs. However, the real valued FFT algorithm used in the present invention has never been considered or even mentioned in the context of DSL modulators/demodulators, nor has it been used for a computational pipeline for a DMT engine with substantially reduced computational time. In addition, CO ADSL applications impose constraints on a DMT engine's latency and SNR, which have not been considered in previous implementations of processors using the algorithm.

SUMMARY OF THE INVENTION

The real-valued FFT processor of the present invention implements Bergland's real-valued FFT and uses unique interstage switching/delay modules to reduce pipeline latency. In one embodiment, modified hybrid floating point arithmetic is also employed to provide maximum SNR. The real-valued FFT processor is particularly suited for a DMT engine and, in a multichannel CO ADSL application, the DMT engine can be multiplexed between the channels to provide an economic, low cost CO solution. Even though algorithms exist that are more efficient in terms of computation speed, Bergland's algorithm is believed to be the most economical in resources without particularly impacting speed and, thus, is more fit than the others for a multichannel CO ADSL application where cost-effectiveness is of a prime importance.

BRIEF DESCRIPTION OF THE DRAWINGS

FIG. 2 diagrammatically illustrates a direct mapping of the forward Bergland real-valued FFT algorithm to the forward Cooley-Tukey FFT algorithm illustrated in FIG. 1a;

FIG. 9c illustrates the data flow through the first switch/delay module of the processor of FIG. 5;

DETAILED DESCRIPTION OF THE INVENTION

Figure 1A:
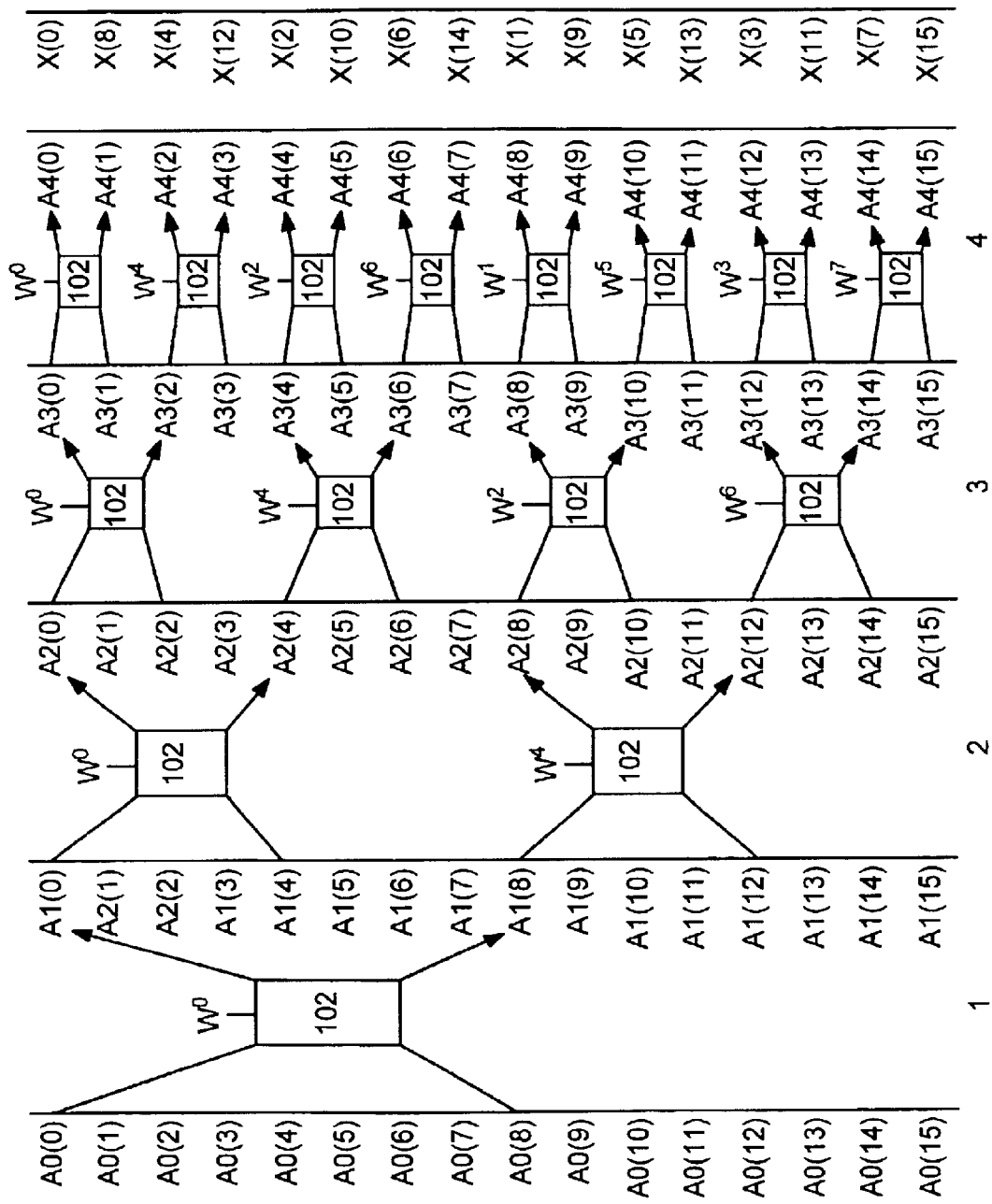
FIG. 1a diagrammatically illustrates the forward Cooley-Tukey algorithm for a radix-2 decimation in time complex FFT with N=16.

As is known in the art, given a series of N samples, $x(n)$, its discrete Fourier transform, $X(k)$, is:

$$X(k) = \sum_{n=0}^{N-1} x(n) e^{\frac{-j2\pi k}{N}}$$

The widespread application of the DFT to many fields of digital signal processing was the result of the rediscovery in the mid-1960s by Cooley and Tukey of a fast algorithm for computing the DFT, know as the Fast Fourier Transform. In a radix-r FFT, as developed by Cooley and Tukey, the DFT is decomposed into r-point DFT calculations and multiplications by rotational vectors, or so-called "twiddle factors." These computations form the basic computational element, typically called a "butterfly." Interconnection of the butterflies provides for the radix-r FFT. A Cooley-Tukey radix-2 decimation in time complex FFT is shown diagrammatically in FIG. 1a for N=16. A 16 sample, complex input A0(0)–A0(16) is applied to the groups of interconnected butterflies 102, which produces the DFT complex output X(0)–X(15). When the input A0(0)–A0(15) is natural ordered, the output of the algorithm X(0)–X(15) is in bit-reversed order. A reordering can be performed on the outputs to place them in natural order.

It should be noted that only the first set of butterfly computations for each group is illustrated for clarity, even though butterfly computations are performed N/2 times in each group. The set shown for each group is applied sequentially to all of the data items in the group. For instance, in group 1, the butterfly is illustrated being applied to the A0(0) and A0(8) data items. The butterfly is then sequentially applied to the A0(2) and A0(9) data items, the A0(3) and A0(10) data items, etc. Similarly, for group 2, the set of butterflies illustrated comprises a power 0 (i.e., $W^0$) butterfly applied to the A1(0) and A1(4) data items, while a power 4 butterfly is applied to the A1(8) and A1(12) data items. This set is applied sequentially to the data items, i.e., the power 0 butterfly is next applied to the A1(1) and A1(5) data items, while the power 4 butterfly is applied to the A1(9) and A1(13) data items, etc.

Figure 1B:
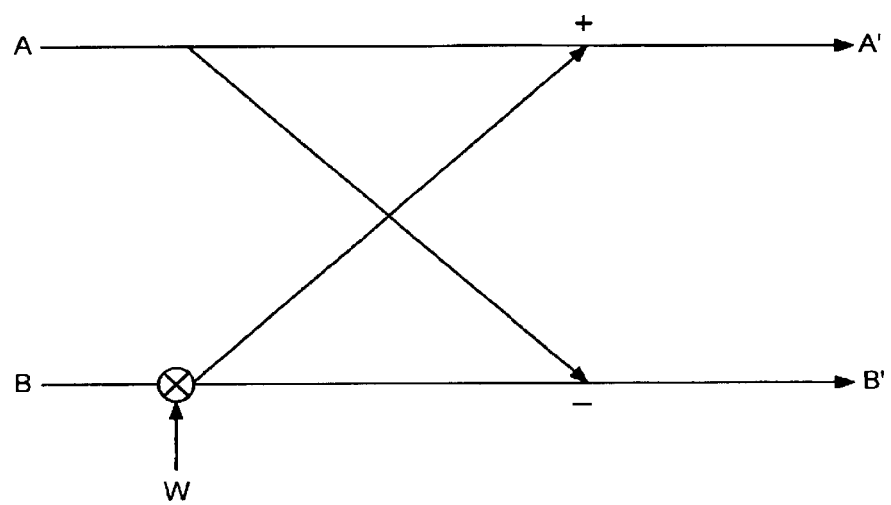
FIG. 1b illustrates the butterfly of the Cooley-Tukey FFT algorithm.

The Cooley-Tukey radix-2 butterfly 102 is illustrated in FIG. 1b. As shown in 1b, the computations of the radix-2 butterfly 102 comprise (1) multiplying the second complex input, B, by the appropriate power of the twiddle factor W (as is known, $W=e^{-j2\pi/N}$); (2) adding the resulting product to the first complex input, A, to produce the first output term A'; and (3) subtracting the resulting product from the first complex term to produce the second output term, B'.

A real valued FFT algorithm was described by Glenn Bergland in "*A Fast Fourier Transform Algorithm for Real-Valued Series.*" Bergland's algorithm works by eliminating the redundant computations in the Cooley-Tukey FFT algorithm when it is known that the input signal is real valued (for the Forward FFT) or has conjugate symmetry (for the Inverse FFT). The net result is an algorithm requiring one less computational pass, than the regular complex FFT.

The redundant computations eliminated by the Bergland algorithm are described with reference to the Cooley-Tukey algorithm in FIG. 1a. When the inputs A0(0)–A0(15) are real, the A1 values are real because W=1 for all of the butterflies in group 1(the butterflies in group 1 all have powers of 0). However, in the subsequent groups, butterflies with powers other than 0 occur. These result in complex numbers. Half of the complex numbers resulting in a group, however, are complex conjugates of the other half of the complex numbers. For instance, the computations in group 2 result in N/2 real numbers, a first set of independent N/4 complex terms, and a second set of redundant N/4 complex terms. The second set of N/4 complex terms are redundant because they are simply complex conjugates of the first set of complex terms, Thus, the second set of complex terms do not need to be calculated because they can be generated by simply conjugating the appropriate value from the first set. This continues for each group until the last stage, which results in N/2−1 independent complex Fourier coefficients (from which the other complex coefficients can be generated) and 2 real Fourier coefficients. The Bergland algorithm takes advantage of this redundancy.

Figure 2:
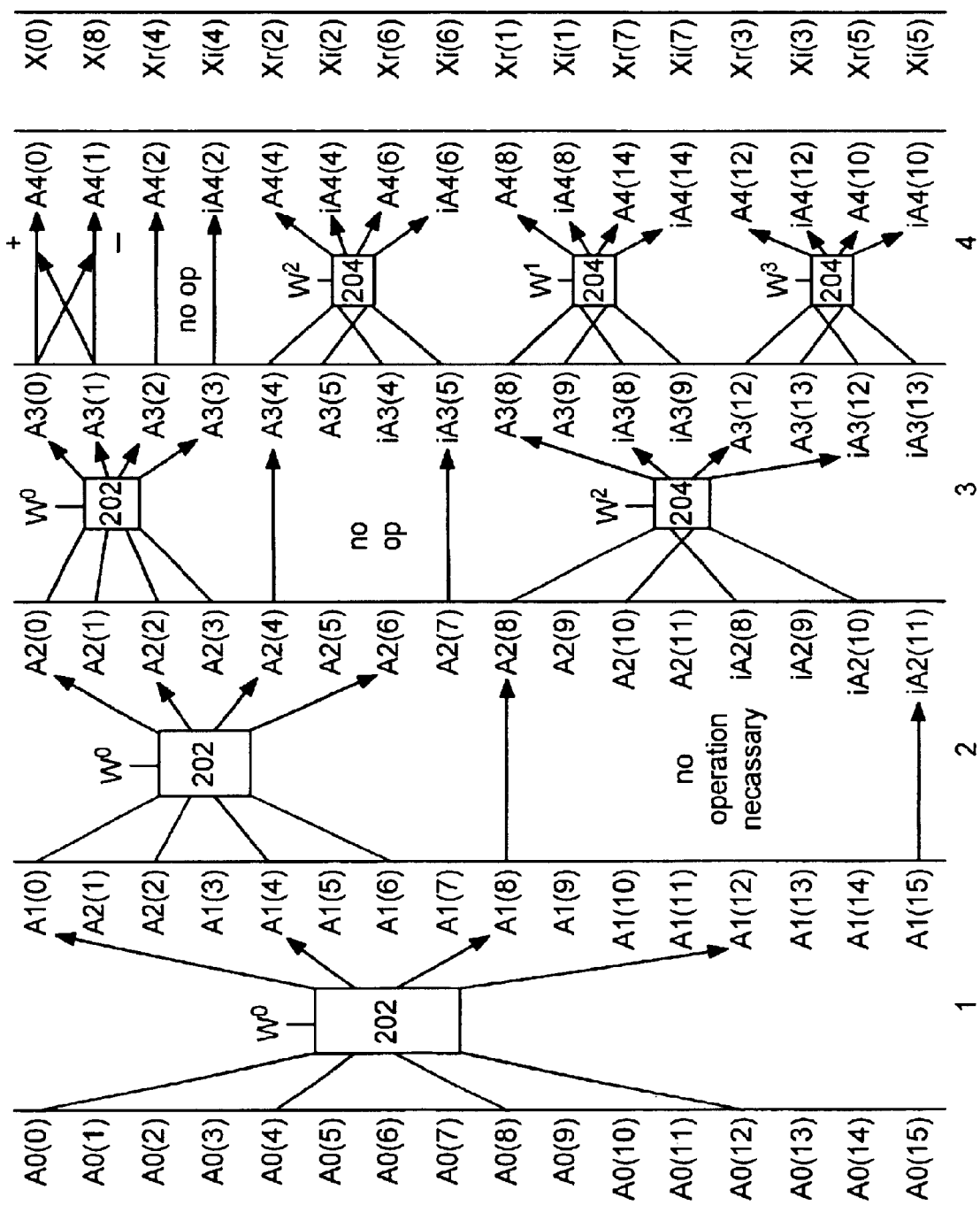

A direct mapping of the Bergland algorithm to the Cooley-Tukey algorithm for the forward FFT is illustrated in FIG. 2, where butterflies 302 and butterflies 304 are Bergland butterflies. Butterflies 302 are simplified versions of butterflies 304 because W=1 (i.e., is power 0) for butterflies 302. The input values A0 are real. The Bergland algorithm does not calculate the redundant complex terms and, as shown, stores the imaginary portion of the independent complex terms in the storage locations that would normally store the redundant terms. The imaginary parts are labeled with the prefix "i", e.g., iA3(8). Hence, only N storage locations are needed. Note that the output order of the Bergland butterflies results in butterflies with nonzero powers of W, i.e. butterflies 204, to have crossed inputs.

Figure 3A:
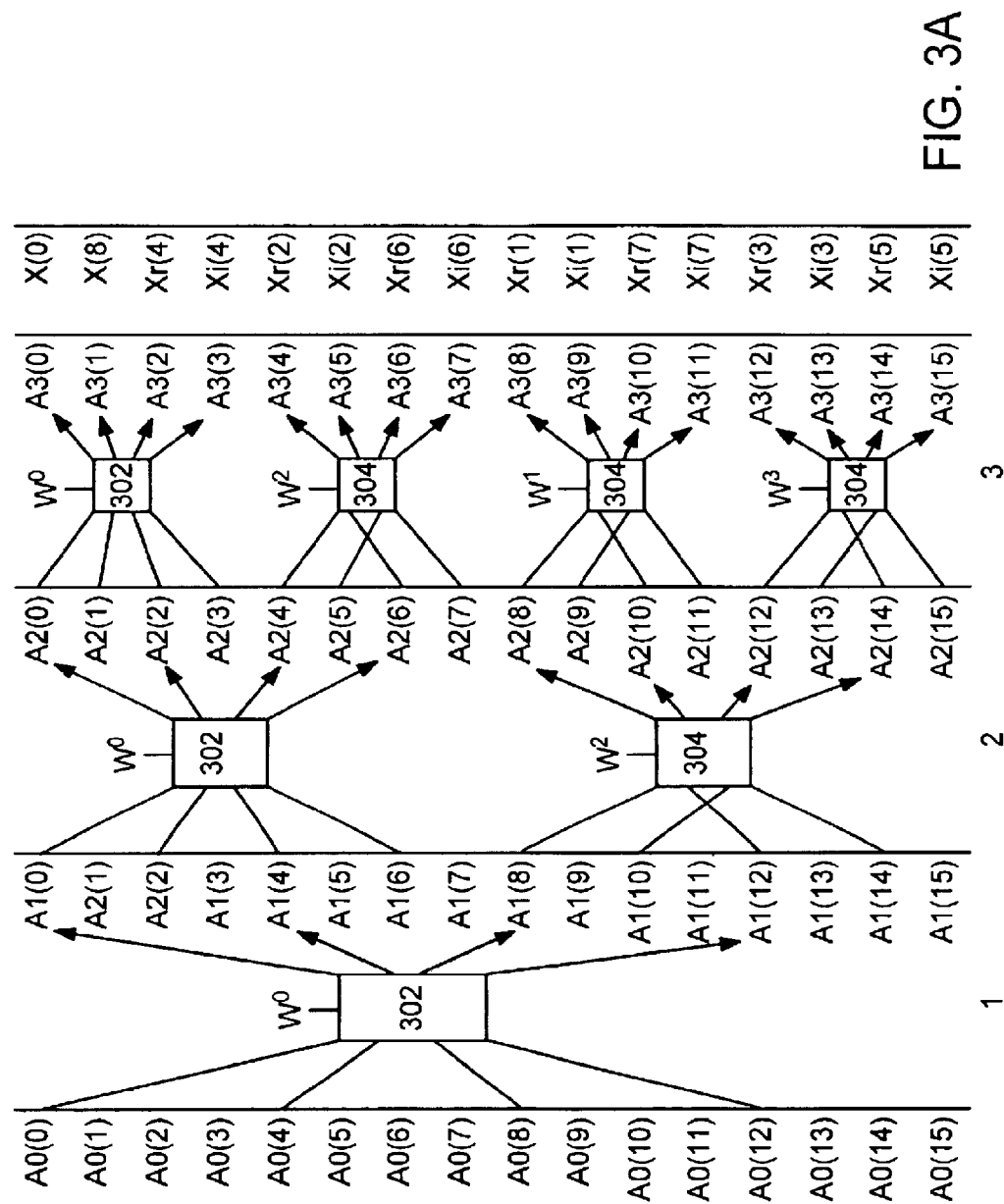
FIG. 3a diagrammatically illustrates the reduced computational passes of the Bergland real-valued FFT algorithm.

Also, as shown, for the Bergland algorithm, no computations are necessary for the butterflies with the N/4 power of W, i.e. W=−j. Rather, the results of these computations can be achieved by a negation and a relabeling of half of the current outputs as imaginary inputs for the next group. This is indicated by the "no operations necessary" areas. For instance, the A1(12) value is simply relabeled as the imaginary part of the A2(8) value for the next group of computations. This allows for a computational group to be eliminated (except for one addition and one subtraction) by performing the negation and relabeling prior to the "no operation necessary points" and performing the next set of computations during these points. The final algorithm with the computational group eliminated is illustrated in FIG. 3a.

Figure 3B:
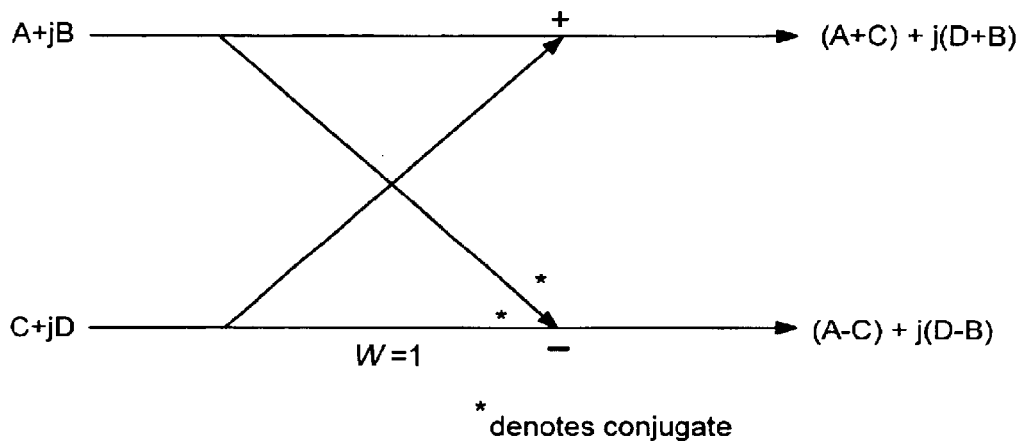
FIG. 3b illustrates the butterflies of the forward Bergland real-valued FFT algorithm.
Figure 3B:
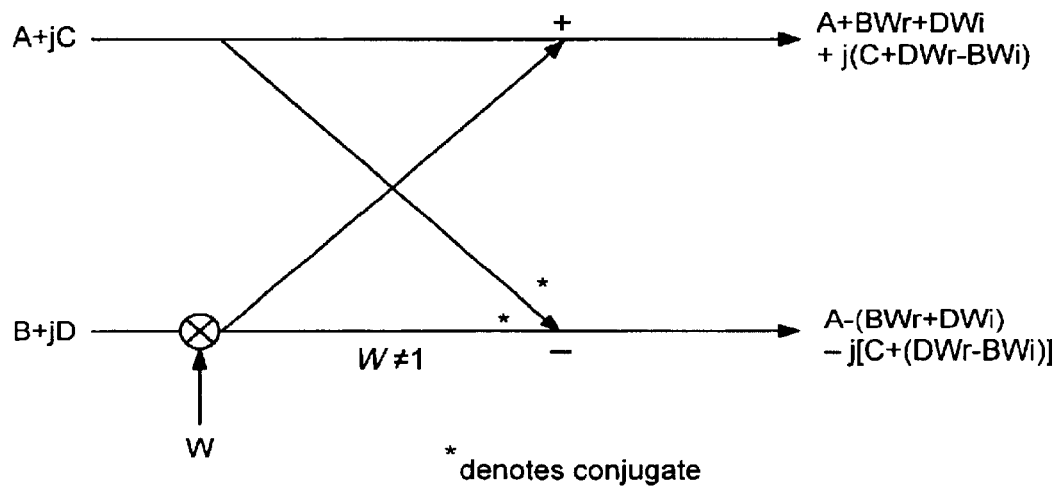

FIG. 3b illustrates the Bergland butterfly for W=1 and for W 1. The Bergland butterfly is similar to the Cooley-Tukey butterfly, however, the subtracted terms are first conjugated (or alternatively, the result of the subtraction is conjugated). The W=1 butterfly is a simplified version of the W 1 butterfly because a multiplication is not needed when W=1.

The Bergland butterfly takes two inputs for each half of the butterfly. For the W=1 (power 0) butterflies, only real values are input, however, these real values are treated as complex values. Thus, the butterfly computations are performed on two complex inputs created from the four real inputs. The resulting "real" parts are stored separately from the resulting "imaginary" parts. The "real" and "imaginary" parts resulting from the addition are each one of the real terms generated by a group. The result of the subtraction is one of the independent complex terms generated by a group. Its real part is stored separately from its imaginary part.

The input A corresponds to the first input to the butterfly, B to the second, C to the third and D to the fourth. Hence, for instance, for the butterfly illustrated for group 1 in FIG. 3a:

$A=A0(0)$ $B=A0(4)$ $C=A0(8)$ $D=A0(12).$

The computations then result in:

$A1(0)=A0(0)+A0(8)$ $A1(4)=A0(12)+A0(4)$ $A1(8)=A0(0)-A0(8)$ $A1(12)=A0(12)-A0(4).$ with A1(0) and A1(4) being 2 of the N/2 real terms generated by group 1 and A1(8) and A1(12) being one of the N/4 independent complex terms generated by group 1 (the real part is stored in A1(8) and the imaginary is stored in A1(12)).

For the W 1 butterflies, complex values (with their imaginary and real parts stored separately) are operated on and the second complex term is multiplied by the appropriate power of the twiddle factor W. The input A still corresponds to the first input to the butterfly, B to the second, C to the third and D to the fourth, however, the C and D inputs are crossed during the calculations for butterflies with W 1, as previously described. Hence, for instance, for the power of 2 butterfly illustrated for group 2 in FIG. 3a:

$$A=A1(8)$$

$$B=A1(10)$$

$$C=A1(12)$$

$$D=A1(14).$$

with the computations resulting in:

$$A2(8)=A1(8)+A1(10)*Wr+A1(14)*Wi$$

$$A2(10)=A1(12)+A1(14)*Wr-A1(10)*Wi$$

$$A2(12)=A1(8)-(A1(10)*Wr+A1(14)*Wi)$$

$$A2(14)=-A1(12)-A1(14)*Wr+A1(10)*Wi$$

where Wi and Wr are the imaginary and real parts, respectively, of twiddle factor W.

Figure 4A:
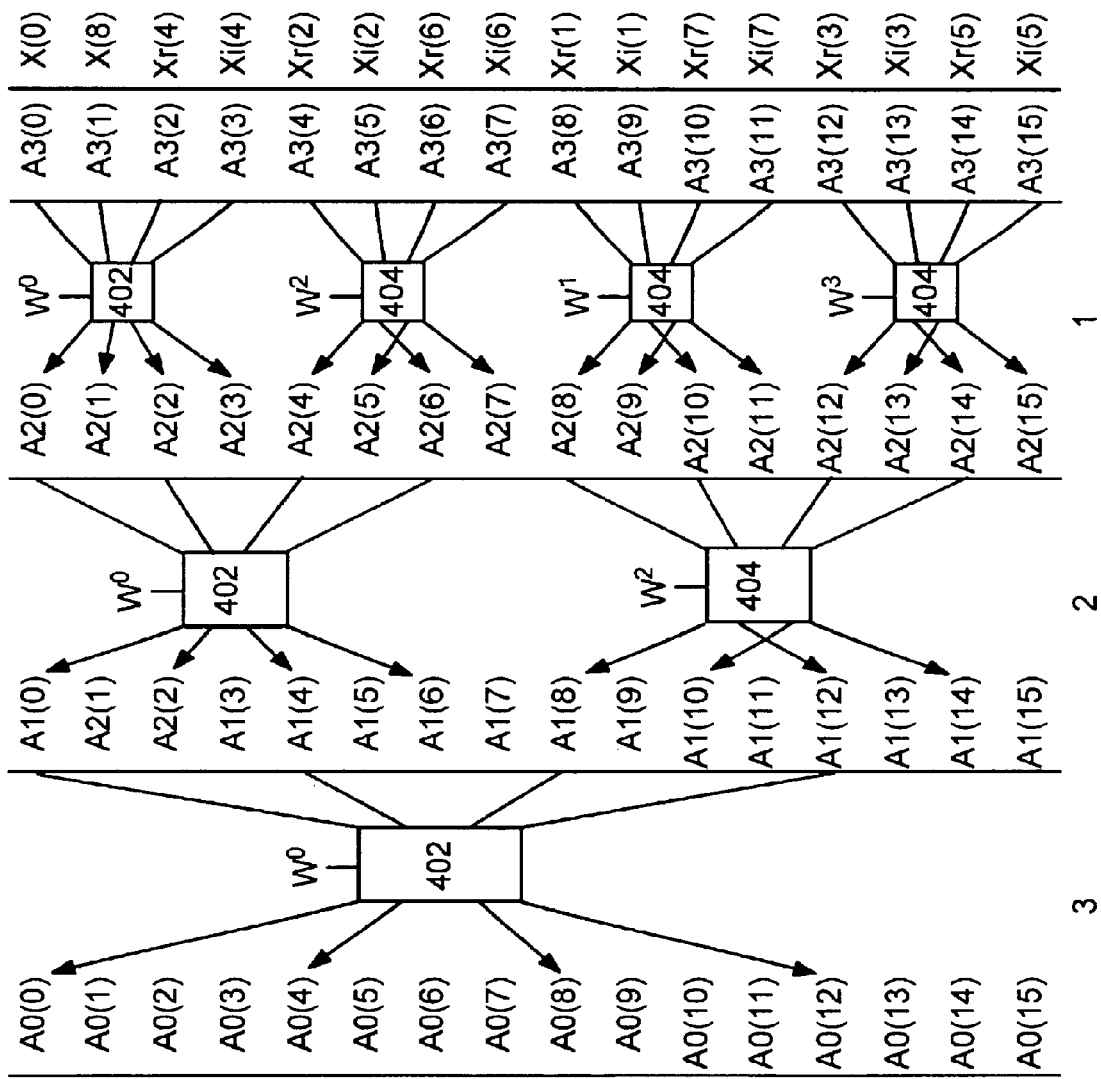
FIG. 4a illustrates the inverse Bergland real-valued FFT algorithm.
Figure 4B:
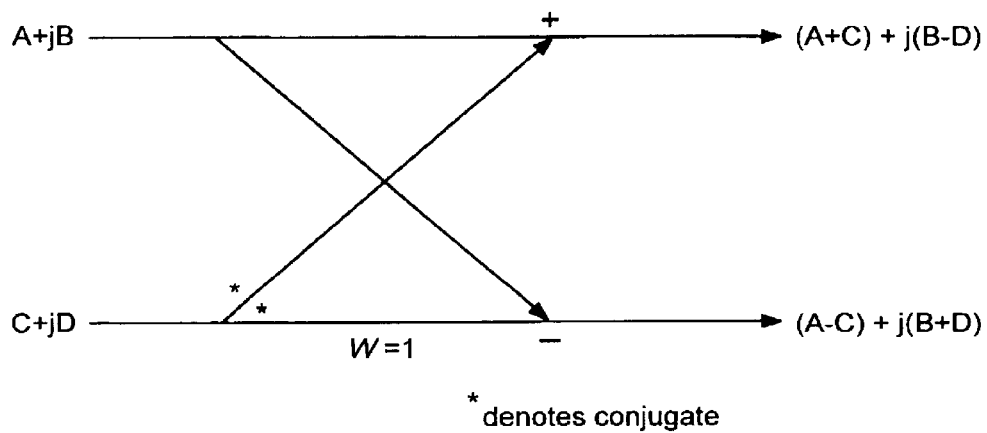
FIG. 4b illustrates the butterflies for the inverse Bergland real-valued FFT.
Figure 4B:
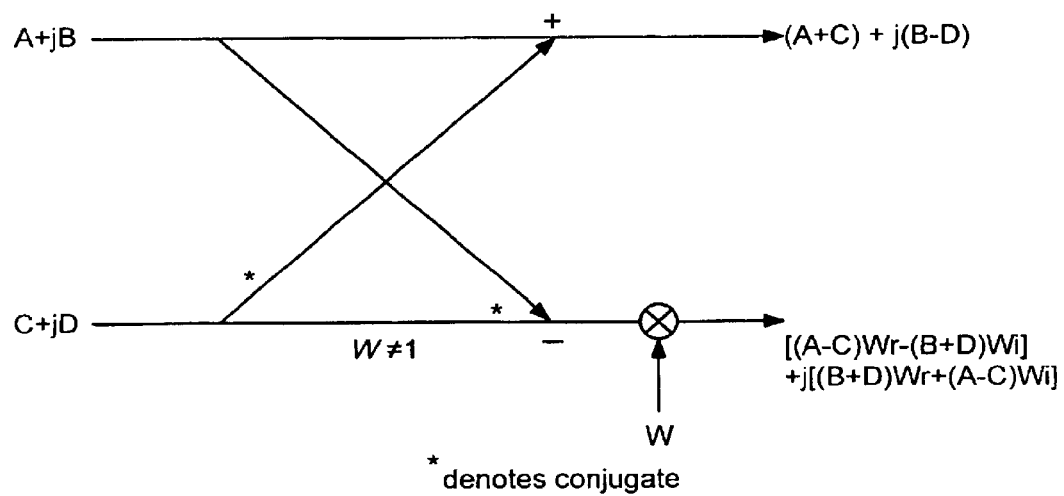

The Bergland algorithm is reversed to perform an IFFT. This is illustrated in FIG. 4a for N=16. It is convenient to start with the Fourier coefficients in the scrambled form the forward FFT would have computed them because this results in a natural ordered output. However, as is apparent to one of skill in the art, the Fourier coefficients can be natural ordered, with a reordering performed to place the output in natural order. As shown, by starting with N/2–1 complex coefficients and 2 real coefficients in scrambled form, the N term real series is computed in natural order. As shown in FIG. 4b, the Bergland butterflies for the IFFT consist of the same computations as the butterflies for the forward FFT, except they are done in reverse. It should be noted that, at the output, the imaginary portion of the first output and the real portion of the second output are crossed when stored. Hence, for instance, for the power of 2 butterfly illustrated for group 2 in FIG. 4a:

$$A=A2(8)$$

$$B=A2(10)$$

$$C=A2(12)$$

$$D=A2(14).$$

with the computations resulting in:

$$A1(8)=A2(8)+A2(12)$$

$$A1(10)=[(A2(8)-A2(12))*Wr]-[(A2(10)+A2(14))*Wi]$$

$$A1(12)=A2(10)-A2(14)$$

$$A1(14)=[(A2(10)+A2(14))*Wr]+[(A2(8)-A2(12))*Wi]$$

where Wi and Wr are the imaginary and real parts, respectively, of twiddle factor W.

The real-valued FFT processor according to the principles of the present invention with a computational pipeline based on the Bergland algorithm provides distinct advantages when it is a part of a DMT engine used in the context of ADSL. The Bergland algorithm does not require a pretwiddle or post twiddle computing pass. This means further increases in computation speed. The computation speed is comparable to radix-4 FFTs, however, with less round off errors in fixed-point implementations, such as the ones currently employed for ADSL. Further, radix-4 FFTs have a more complicated butterfly, which makes it more prone to overflows in a fixed-point implementation. On the other hand, the Bergland algorithm uses a butterfly almost identical to the simpler radix-2 butterfly, even though geometrically (by data addressing pattern) the Bergland butterfly looks like a radix-4 algorithm.

Figure 5B:
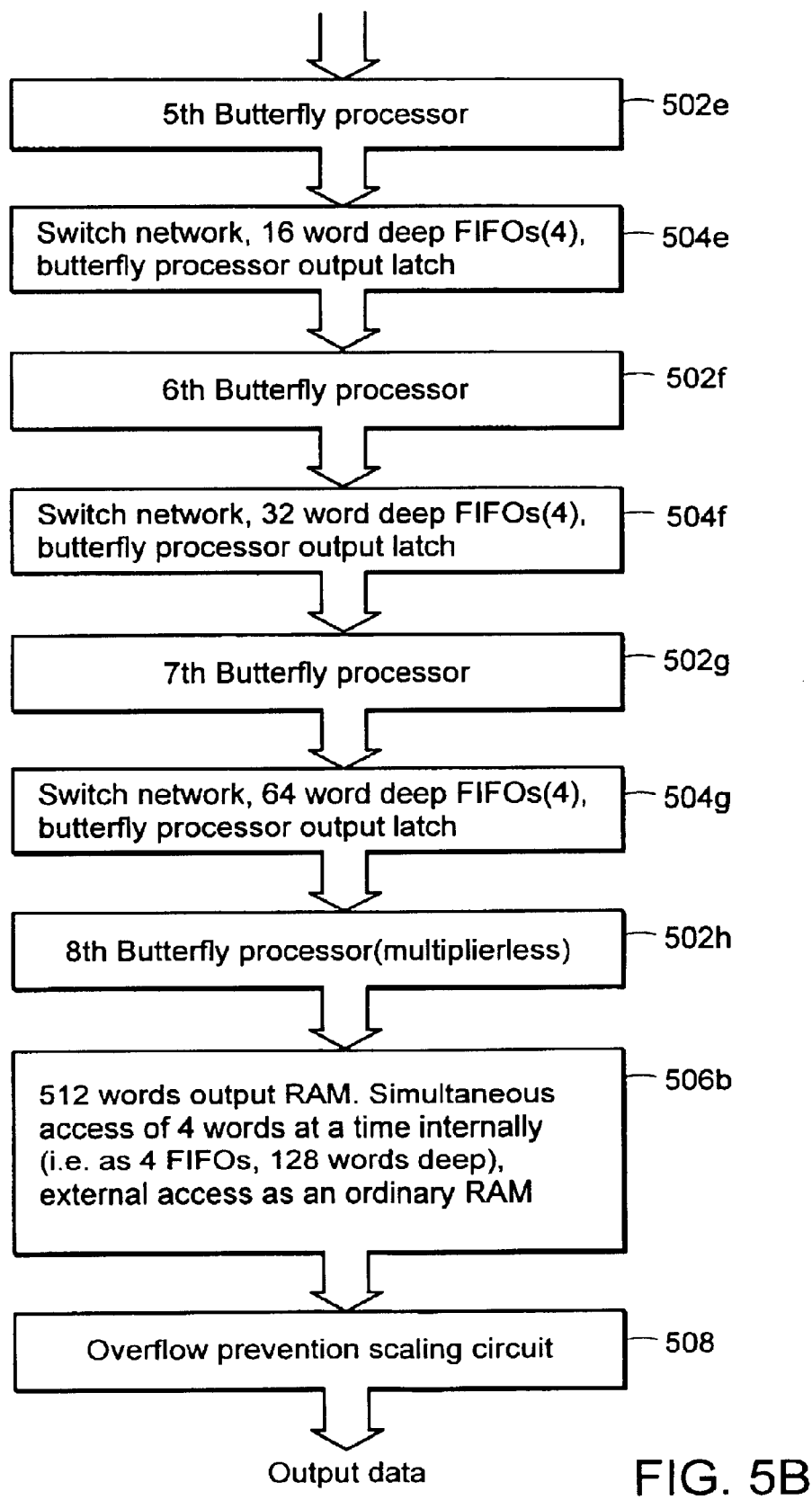
FIG. 5 conceptually illustrates an overview of the pipelined, real valued FFT processor architecture according to the present invention.

FIG. 5 illustrates an overview a real-valued FFT processor 500 according to the present invention for a DMT engine. It should be understood that the term real-valued FFT processor is meant to encompass within its scope both the architecture for real-valued inputs for a forward FFT and the architecture for conjugate symmetric input for an inverse FFT. Shown is the architecture for an exemplary implementation for a processor architecture that performs an inverse FFT on complex-valued input (typical of the DMT in an ADSL transmitter) of length N=512 using 16-bit data words for each data item.

The real-valued FFT processor architecture of the present invention uses a pipelined architecture to implement the Bergland algorithm. A pipelined architecture is a known computational structure permitting extremely fast algorithm execution, while maintaining hardware resources at a manageable level. For example, some pipelined FFT processor designs are described in U.S. Pat. Nos. 6,081,821 and 4,534,009.

As illustrated in FIG. 5, a real-valued FFT processor 500 of the present invention comprises several, pipelined butterfly processor stages 502 interconnected by switch/delay modules 504 that comprise interstage switch networks coupled with appropriately sized FIFO delay buffers. Each processor stage comprises a processing section for the butterfly computations.

Illustrated is an exemplary implementation for N=512. For N=512, there are eight butterfly processors 502 because, when N=$2^m$, the number of butterfly stages needed for the Bergland algorithm is equal to m−1, including the multiplierless stage with one addition and one subtraction.

The I/O interface of processor 500 is preferably provided by conventional RAM type access. That is, input data is fed into and stored in input RAM 506a, while output data is stored in output RAM 506b. I/O RAMs 506 are preferably accessed as conventional RAM outside of processor 500, while internally it acts as a four-way pipeline. That is, four contiguous data words are read out of input RAM 506a simultaneously to the pipeline and four contiguous data words are stored into output RAM 506b simultaneously. For an implementation with N=512, as shown, I/O RAMs 506 store at least 512 words and are accessed internally as 4 FIFOs that are 128 words deep(to provide simultaneous access to four contiguous data words). Preferably, the unique address pattern of the Bergland FFT algorithm is embedded in the address decoders of I/O RAMs 506 so that no access time penalties are incurred as they would be if lookup table indirect addressing were performed.

Pipelined processors are known for having inherent latency, which is the period of time needed for a batch of data to exit the pipeline after it has been loaded. Latency directly impacts execution speed, and large penalties are seen in speed if a pipelined processor is used in a start/stop mode, i.e. it is not fed with a continuous stream of data. This is a very likely situation in a multichannel ADSL CO transmitter. Latency is minimized in the real-valued FFT processor architecture 500 of the present invention by performing interstage data routing with interstage switch/delay modules designed to reuse delays as described below.

In addition to substantially reduced latency, one embodiment of processor 500 provides for the appropriate level of SNR (in the sense of Signal to Quantization noise Ratio) required by ADSL DMT systems by using a modified hybrid floating point internal representation with guard bits. Hybrid floating point representation is a known technique, however, the implementation of this technique in processor 500 is modified from the usual implementation, allowing processor 500 to match the speed of processing exponents to the speed of the data processing units. The last pipeline stage also uses a scaled denormalizing technique (for removing the exponents) so as to eliminate output arithmetic overflows. The scaled denormalizing technique is performed by the overflow prevention circuit 508 (also referred to as output normalizing circuit). Overflow prevention circuit 508 is shown after output RAM 506b, however, it can be place before output RAM 506b. Placing overflow prevention circuit 508 before output RAM 506b is more economical since, in this case, there would not be a need to store the exponents of the final result in the output RAM 506b.

The hybrid floating point representation is used to eliminate interstage overflow problems without sacrificing processing speed. Parseval's theorem as applied to the Discrete Fourier Transform states that the energy of the transformed samples is N times that of the block of signal samples being transformed, where N is the size of the transform. That means a growth in the magnitude of the results is observed in each computational pass of the algorithm. While almost harmless in a floating point computing environment, this growth can cause serious problems when fixed point data format is used. Floating point numbers are "autonormalizing", that is they automatically adjust the range of numbers that are currently represented at the expense of lack of precision. Under normal conditions they seldom underflow (i.e., try to represent unrepresentably low magnitude values) or overflow (i.e., try to represent values that are so big that they are out of any representable range).

Processor 500, however, preferably uses fixed point representation. Fixed point numbers span a set of values in a range with equal precision, and cannot represent values outside that range. Usually that range is from some minimum negative number up to some maximum positive one. It is said that overflow occurs if values outside that range have to be represented. With algorithms known to produce intermediate results that grow in magnitude, as the FFT, an overflow is very likely to occur in a fixed point system.

The usual saturation or clipping at the max positive (or negative) value, as performed in digital filters, is unacceptable if an overflow has to be handled in any of the computational stages of an FFT processor, except the final one. The reason is that the error from a saturated data word participates in the computation of many subsequent results (how many depends on the current stage), which in turn will be wrong, producing a snowball effect of errors. A classic approach to handle this situation is to scale the data words by dividing them by two (performing 1 right shift) before they enter the computation. In a radix 2 FFT, this almost guarantees no overflow. Similarly, in radix 4 FFTs, the scaling must be a divide by 4. While this works, this unconditional divide by 2 (or 4) lowers the signal to noise ratio to a value that might be unacceptable in certain situations. For instance, for the 512-point sample size implementation, a processor 500 of the present invention has 8 stages as shown. This means 8 right shifts would be used resulting in an SNR below 50 dB. A SNR of at least 60 dB, however, is required for ADSL DMT operation.

Another approach to preventing overflow is the so-called block floating point arithmetic. In this format, the arithmetic is done as usual on a fixed point hardware and, when overflow occurs, the result is corrected by scaling the result, while an exponent data word (one and the same for the entire FFT) is incremented for each divide by. At the end of a pass, all intermediate results are resealed by the number of exponent increments during the previous pass. That way all intermediate values are in the same range for the next computational stage. While attractive for not permitting overflows, block floating point arithmetic presupposes a resealing pass if an overflow had occurred in the previous pass, which slows algorithm executions and adds complexity to both software or hardware implementations. Also, permitting an overflow to occur, while still being able to correct the final result by rescaling, requires arithmetic circuits of greater width than the data words.

A modification of the block floating point scheme uses guard bits. In a guard bit block floating point scheme, the two or three (depending on the FFT radix) MSBs of a data word are required to be the same, i.e. equal to the sign bit. If an intermediate result spreads out into the guard bits, it is assumed that it will be likely to generate a real overflow in subsequent computations, although it is perfectly valid per se. This guard bit overflow condition is trapped, and acted upon in the above-explained block floating point manner. It is seen that in the guard bit case, the arithmetic units do not have to have more bits than the data words, thus, simplifying the hardware. The price to pay is a constant reduction in the dynamic range; 6 dB per guard bit.

The use of the guard bit method is justified when the dynamic range to be covered is somewhat less than the full dynamic range offered by the word length used throughout the digital hardware. This is the case for ADSL, where the requirement is an SNR at least 60 dB and the standard word length for fixed point arithmetic is 16 bits insuring 90 dB of SNR (1 bit is kept for the number sign).

Block floating point processing has to be modified for real time processing that does not permit stopping of computations and that does not necessarily have an easy access to intermediate results, e.g. a high-speed pipelined FFT engine. In those cases a system called hybrid floating point is employed. In a hybrid floating point system each data value has an exponent, but this exponent only grows (because of the nature of the FFT algorithm) so if a normalization of a result has to be performed it is obtained by right shifts only. The arithmetic operations are performed by fixed point hardware only on numbers in the same range. Since each data word carries along its exponent, there is no need for a block rescaling upon overflow, rescaling can be performed at the input of the butterfly processor (the processor executing the core FFT computing operation). That means processor operation without interruption and with guaranteed absence of overflows in all computing stages, at the expense of having an exponent for each data word. This price to pay is insignificant by modem hardware implementation standards. For example a 4 bit exponent is sufficient for FFTs of size up to 32768 and 16 bit data words, the exponent being always considered to be a positive number. This is an increase of 25% in memory requirements to insure an error free fixed point FFT operation.

As described, an embodiment of processor 500 uses such a hybrid floating point representation with guard bits to eliminate interstage overflow problems. Each data value, therefore, has an associated exponent, which is always handled as a positive number. For the exemplary implementation of processor 500, 16-bit fixed-point arithmetic is used with 4 bit exponents associated with each data word. A 4 bit exponent word encompasses shifts from 0 to 15 bit, which is sufficient for 16 bit two's complement numbers. Also, 2 MSBs following the sign bit in the 16 bit word are used as guard bits for the exemplary implementation of processor 500. This provides a SNR of 78 dB throughout the FFT computations.

To perform the hybrid floating point processing, each butterfly processor 502 has an input and output section for the overflow processing. Also, since exponents have to travel in synchrony with their associated data words, the exemplary implementation of real-valued FFT processor 500 (i.e., the pipeline equalizing delay, i.e. FIFOs 504a–g, and switch network) are either designed to operate on 20 bit words, or two similar pipeline structures are run in parallel, one 16 bit for the data path, the other 4 bit for the exponent path. For instance, each internal FIFO 504a–g can comprise a data FIFO and an exponent FIFO of equal depth.

The input section of first butterfly processor 502a derives the initial exponents for the hybrid floating point representation. The data initially enters first butterfly processor 502a in a regular fixed point format from input RAM 506a and doesn't have an exponent. Therefore, the exponents are derived from the data. To derive the initial exponents, the three MSBs of each data word are analyzed and each data word is shifted right 0, 1, or 2 positions according to how many guard bits are different from the sign bit. The number of right shifts constitutes the data word exponent. This all happens in the input section of first butterfly processor 502a. As will be described further below, in order to derive the initial exponents, the input section of first butterfly processor 502a is identical to the output section of first butterfly processor 502a.

After first butterfly processor 502a, each data word input to a butterfly processor 502b–h may have a different exponent. In order for an arithmetic operation to be meaningful, the data words that it uses must have the same exponent. Except for a power of 0 butterfly, all four data words participate together to produce output results. Therefore, prior to entering the processing section of each butterfly processor 502b–h, all four input words are adjusted in the input section of each butterfly processor 502b–h, if needed, so that their exponents are the same.

To make the four exponents equal, the maximum exponent among the four data words is determined and the remaining exponents associated with the other three data words are readjusted such that their exponents are equal to the maximum exponent. In other words, the three data words are shifted to the right by a number of shifts equal to the difference between the maximum exponent found and the corresponding data word exponent.

A classical way to find a maximum of four values is to use three comparisons. Then data word exponents are subtracted from the maximum found. The three comparisons need two levels of processing circuitry (two comparators at the first level, one at the next), followed by a subtraction from the selected maximum, i.e. a fourth level of processing, not counting the intervening multiplexers.

Processor 500, however, implements a modified technique to perform the adjustments faster, without increases to the hardware resources needed. The modified technique allows the speed of processing exponents to be matched to the speed of the data processing units. As described below, this modified technique takes into account the fact that all exponents are positive and forms all possible subtraction results in parallel.

After the input sections of butterfly processors 502a–h derives or adjusts the exponents, the processing section of butterfly processors 502a–h performs a butterfly computation. Once the processing section of a butterfly processor 502a–h performs a butterfly computation, a result word (or multiple result words) may spread into the guard bits. The output sections of the butterfly processors 502a–h correct this situation. This situation is corrected for in a similar way that the initial exponents are derived from the data as described above. The result word is shifted to the right as much as necessary to make the guard bits the same as the sign bit. The exponent corresponding to that particular result is incremented by the number of right shifts performed on the result word. The incremented exponents and shifted result words are latched into the pipeline on the next pipeline move cycle.

After the last butterfly processor 502h, result data is in the form of a data word with an associated exponent. Each datum might have a different exponent. In order for the result data block to be used further, e.g. to be fed to a DAC for transmission, the exponents have to be removed in a meaningful way. The exponents are removed by an output normalizing circuit 508.

To remove the exponents, a data dependent conversion can be performed. That means the results are normalized by the maximum data sample, taking the exponent into account. This prevents overflow at the output stage, but some very small samples might disappear. This gain variation will have an adverse effect on the ADSL transmission.

Therefore, output normalizing circuit 508 preferably removes the exponents by making all exponents equal to some constant. The natural constant to choose is zero, since with exponent zero all numeric values will be in their natural fixed point format. This implies shifting up (or left) and, consequently, some numbers might overflow the fixed point range. This situation is very similar to the one of converting floating point numbers to fixed point by casting in C. Clipping or saturating the overflowing values, however, is sufficient at this point since these are output values and no further FFT computations depend on them. Preferably, one supplementary precaution is taken for values that are normally in range, but whose magnitude would overflow by just one bit after a left shift that puts the exponent to zero. This precaution comprises scaling by two the final result of the up shifting.

A second option is to select a fixed scale factor and saturate the values likely to overflow after having been scaled. This conversion problem is common to float/fixed conversions. It should be mentioned that a carefully selected scale factor can minimize these output overflows. In this case, the output normalizing circuit 508 works by comparing the current data sample exponent with the scaling value, and then shifts up or down depending on the result of the comparison, positive or negative. The output normalizing circuit 508 also monitors the output normalized value and saturates it, if it grows above the word width of the output memory.

Specific implementations of an input section, a processing section, an output section, and a switch/delay module will be described next.

Figure 6B:
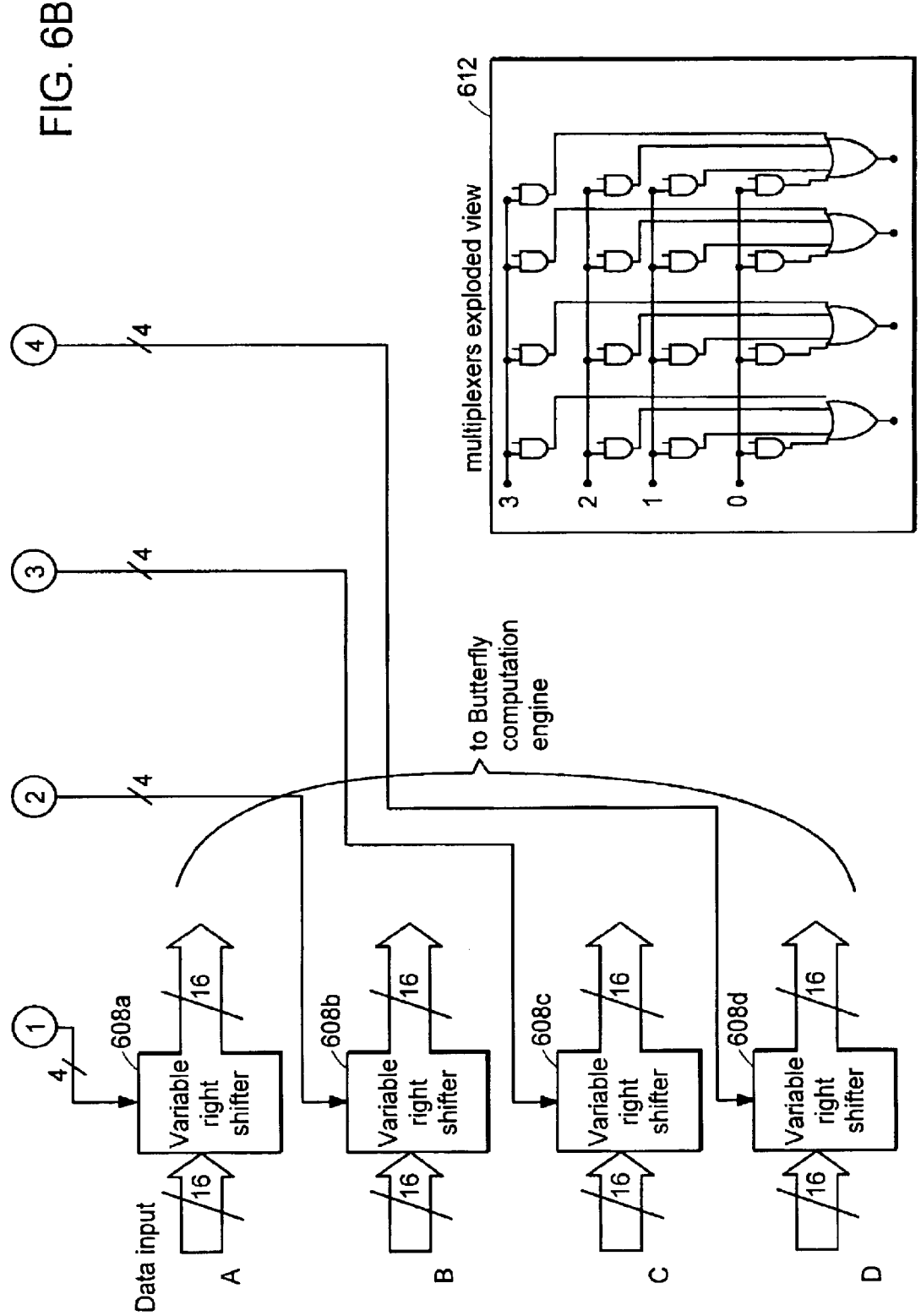
FIG. 6 illustrates an implementation of a butterfly input section.

FIG. 6 illustrates one implementation of a butterfly input section 600 for Bergland butterfly processors 502b–h. As shown, input section 600 comprises subtractor circuits 602, NOR gates 604, multiplexers 606, barrel shifters 608, and a multiplexer 610.

Input section 600 equalizes the exponents using, as described above, a technique that takes into account the fact that all exponents are positive and forms all possible subtraction results in parallel. Since the exponents are positive numbers only, they are not compared or converted into two's complement for subtraction. This simplifies the circuitry needed and increases the speed of operation of the input section. Each exponent is subtracted from each other in parallel by four bit subtractors. Thus, there are four groups of subtractors, one for each exponent. For instance, subtractors 602a correspond to exponent A and, consequently, calculate A–B, A–C, and A–D. Each subtractor group has only three subtractors because the result of subtracting an exponent from itself is known. A subtractor generates a borrow signal (i.e., the Borrow Out will be high) if the subtrahend is bigger than the minuend (e.g., in the case of A–B, a subtractor generates a borrow signal if B>A).

Thus, if an exponent is the maximum exponent, its subtractor group will not generate any borrows. For example, if A is the maximum exponent, then the A group of subtractors 602a will not generate a borrow signal (e.g., the Borrow Out of each subtractor in group 602a will be low). This condition is detected by corresponding NOR gates 604. The outputs of NOR gates 604 then select the outputs of multiplexers 606. Continuing the above example, for instance, if group 602a does not generate any borrow signals (because A is the maximum exponent), NOR gate 604a detects this and outputs a high. As long as no other exponent is equal to A, then the other subtractor groups 602b–d generate borrow signals and, consequently, NOR gates 604b–d output a low. These outputs are supplied to multiplexers 606, and the high from NOR gate 604a causes the first input of each multiplexer to be output. That is, multiplexer 606a outputs 0, multiplexer 606b outputs A–B, multiplexer 606c outputs A–C, and multiplexer 606d outputs A–D.

The differences output by the multiplexers are used to control the amount a respective barrel shifter 608 shifts its exponent. Barrel shifters 608 are restricted to shift only to the right. Thus, when A is the maximum exponent, for example, shifter 608a shifts exponent A zero times to the right. Shifter 608b shifts exponent B an amount equal to the difference between A and B, i.e. A–B. Likewise, shifter 608c shifts exponent C an amount equal to the difference between A and C, i.e. A–C, while shifter 608d shifts exponent D.

The outputs of NOR gates 604 also control multiplexer 610 to output the maximum exponent to the output section as the maximum exponent.

While the example above only described exponent A as being a maximum, it should be noted that it is possible that some exponents are equal and the maximum. In this case, more than one subtractor group will not have any borrows. However, the results of the corresponding subtractions in this case will be equal, so it does not matter which difference is selected to control the corresponding shifters.

Preferably, multiplexers 606 have the structure illustrated at 612. When there is a distinctive maximum exponent, only one of the rows of AND gates receives a high, which enables them to output the values driving their other inputs. All of the other rows receive a low and, therefore, they are disabled (i.e., generate zero as an output). When some exponents are equal and the maximum, then more than one row of AND gates is enabled. However, since the exponents are equal, the values driving the other inputs of the AND gates in these rows are also equal. Thus, there will be no conflict and no misinterpretation of values. In this manner, the more complicated prioritization structures are avoided. These more complicated prioritization structures would be necessary if regular multiplexers are used.

Figure 7B:
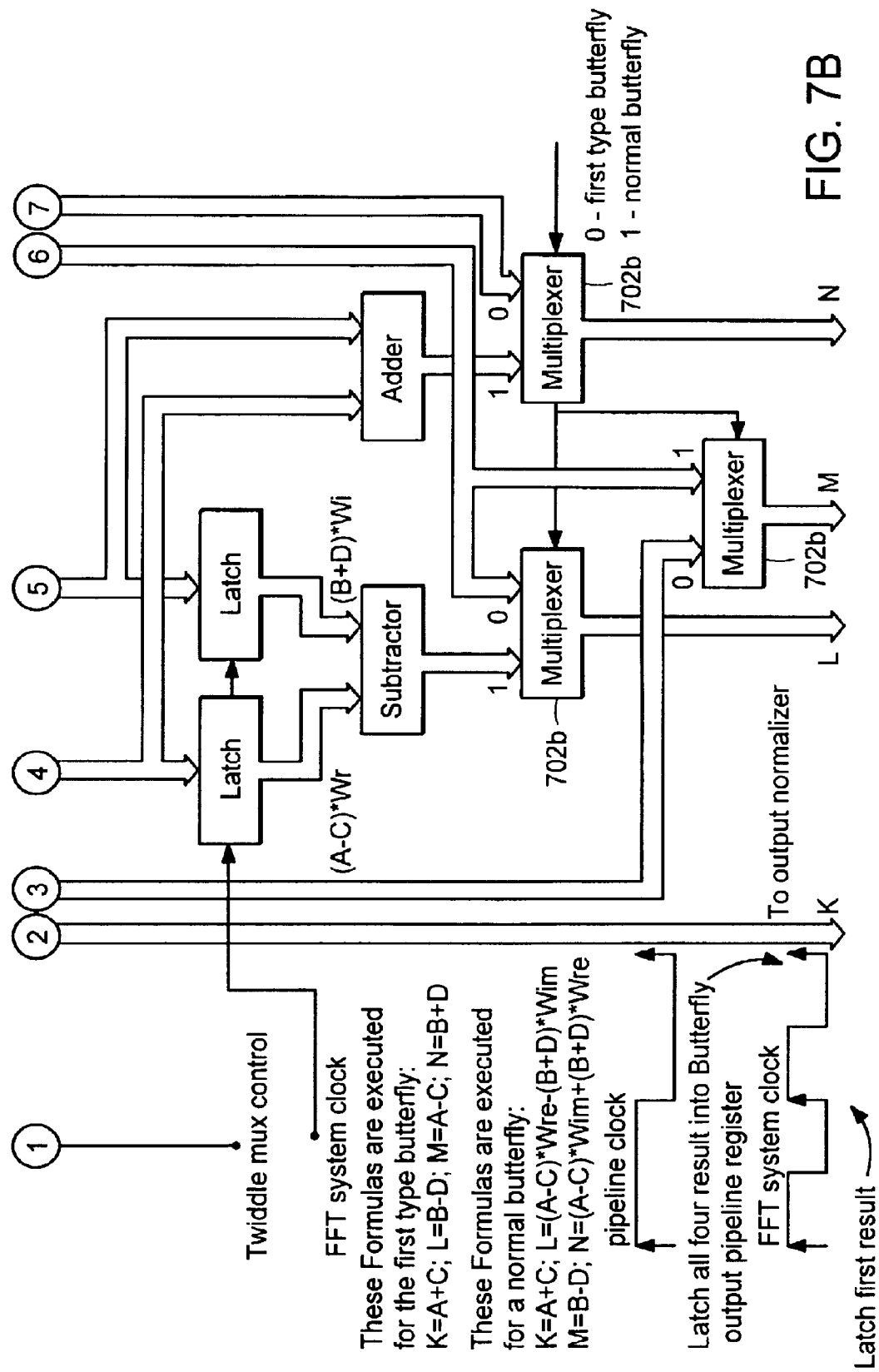
FIG. 7 illustrates an implementation of a butterfly processing section to perform Bergland butterfly computations.

FIG. 7 illustrates one implementation of a butterfly processing section 700 to perform Bergland butterfly computations. Processing section 700 is for an IFFT, therefore, the calculations performed are those discussed with respect to FIG. 4b. Processing section 700 acts as both a W=1 computational unit and a W 1 computational unit, depending upon the setting of multiplexers 702. When multiplexers 702 output their 0 input, processing section 700 acts as a W=0 Bergland butterfly. When multiplexers 702 output their 1 input, processing section 700 acts as a W 1 Bergland butterfly. As will be appreciated by one of skill in the art, processing section 700 performs the following computations when W=1:

$$K=A+C$$

$$L=B-D$$

$$M=A-C$$

$$N=B+D$$

and the following computations for W 1:

$$K=A+C$$

$$L=(A-C)*Wr-(B+D)*Wi$$

$$M=B-D$$

$$N=(A-C)*Wi+(B+D)*Wr;$$

which are the butterfly computations needed for the Bergland algorithm for an IFFT, as shown and described in conjunction with FIG. 4b. Hence, for instance, when butterfly processing section is acting as the power of 2 butterfly illustrated for group 2 in FIG. 4a:

$$A=A2(8)$$

$$B=A2(10)$$

$$C=A2(12)$$

$$D=A2(14).$$

with the computations resulting in:

$$K=A1(8)$$

$$L=A1(10)$$

$$M=A1(12)$$

$$N=A1(14).$$

Processing section 700 is designed to compute a butterfly computation in two cycles to reduce the amount of arithmetic circuitry used (using two cycles reduces the number of multipliers needed). The adder/subtractor network 704 calculates the W=1 butterfly, as well as preprocessing some of the data for the W 1 butterfly. As shown in the figure, a W 1 butterfly takes two steps to produce the L and N results. In the first FFT clock period, the multiplication of the twiddle factors with the preprocessed data from subtractors 704b and 704c forms the two parts of the L result, i.e. (A–C)*Wr and (B+D)*Wi. These parts are latched on the rising edge of the next FFT clock pulse. The latches do not introduce a pipeline delay since they are clocked every FFT clock cycle, rather than on the pipeline advance clock cycles (the pipeline advances at half the hardware (FFT) clock frequency). Also at this next pulse, the twiddle multiplexers 702a are reversed and the computation of the second set of results is started. The reversing of the twiddle factors is simply accomplished by clocking twiddle factor multiplexers 702a with the pipeline move clock. In this way, during the first half of the pipeline cycle, multiplexers 702a output the data from a twiddle factor table in the arrangement needed to compute the parts of the L result as described above. The changing of the pipeline clock in the second half of the cycle then reverses the output arrangement.

The multiplication of the reversed twiddle factors with the preprocessed data from subtractors 704b and 704c forms the two parts of the N result, i.e. (A−C)*Wi and (B+D)*Wr. At the next positive clock edge, the second set of results, as well as the results held in the latches, are added and subtracted, respectively, and passed as result words L and N through the output section and written into the switch/delay module. In addition, result words K and M are passed through the output section and written into the switch/delay module.

The twiddle factors for each butterfly processor 502 are preferably pre-computed and stored in the proper order as a twiddle factor table. The twiddle factor tables are ¼ of the FFT size, regardless of the stage (the position of the butterfly computation unit in the pipeline), i.e. 128 words of sine values and 128 of cosine values for a 512 size FFT. Generally, only the first stage in an IFFT computation needs all 128 distinct (complex) twiddle factors. Subsequent stages need less, e.g. stage 2 needs 64 words, stage 3, 32 and so on. For hardware simplicity and accounting for the fact that memory is inexpensive, all twiddle factor tables are preferably the same size and addressed the same way by the same type of counter. However, to insure correctness of computations, tables that would otherwise be smaller, have repeated values. So in the case where a 64 word table is needed, each value is repeated twice, so the table becomes 128 words. In the case of a 32 word table, each value is repeated four times and so on. The last butterfly processor 502h does not require a twiddle factor table at all, since it doesn't require multiplications. For a 512 IFFT 128*2*7= 1792 words are necessary.

Figure 8B:
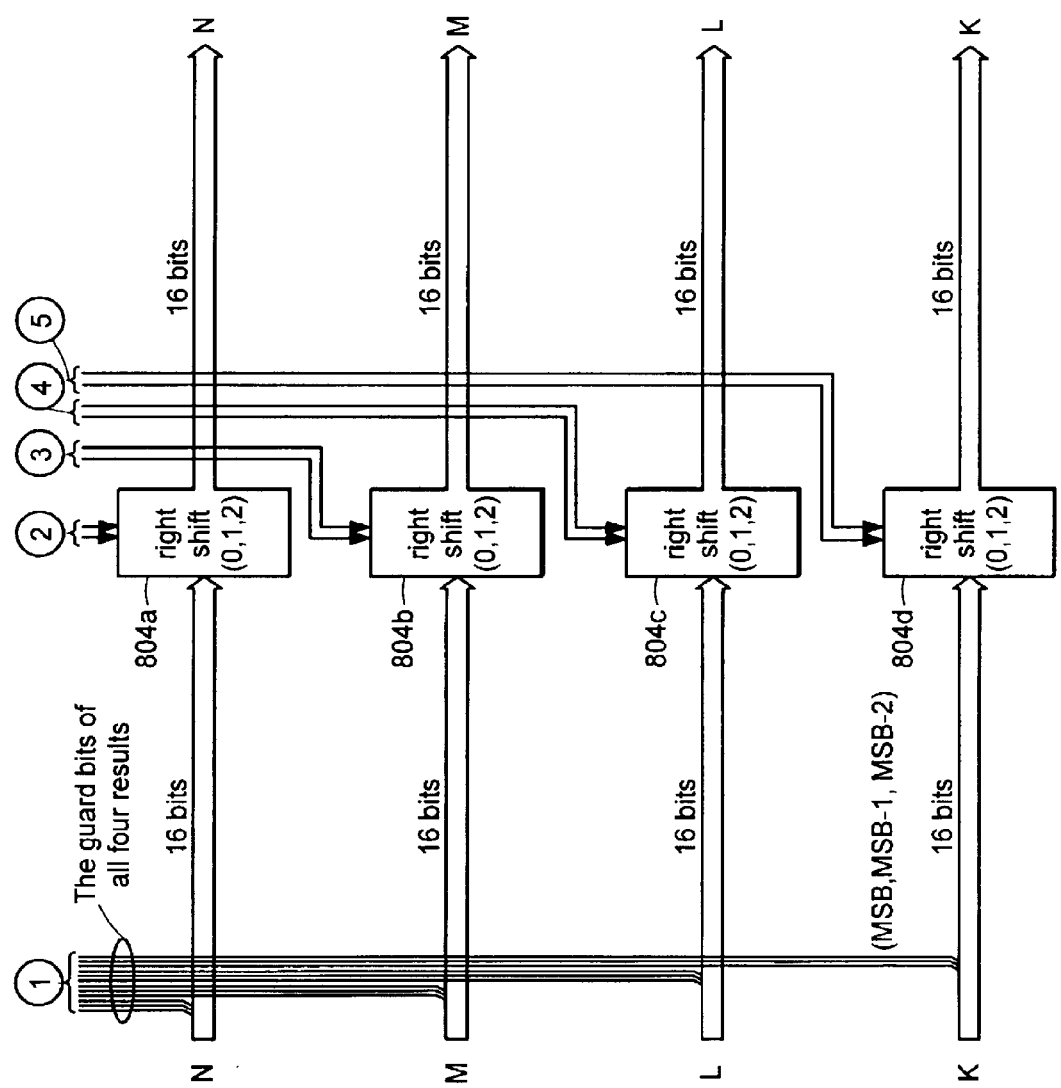
FIG. 8 illustrates an implementation of a butterfly output section.

FIG. 8 illustrates one implementation of a butterfly output section 800 for Bergland butterfly processors 502a–h. Output section 800 is also an input section for first butterfly processor 502a because, as described previously, first butterfly processor 502a has its input identical to its output.

As described above, the output section 800 shifts the result word to the right as much as necessary to make the guard bits the same as the sign bit. The exponent is also increment by 1 for each right shift of the result word. The incremented exponents and shifted result words are then latched into the pipeline on the next pipeline move cycle.

Output section 800 comprises four overflow detectors 802, one for each result word, implemented with an EXOR, EXNOR and a NOR gate. Each overflow detector 802 takes as its input the three MSBs of the corresponding 16 bit result word and produces a 2 bit shift code, which is used to drive a corresponding one of barrel shifters 804. The shift code is 00 if these bits are equal. This represents a shift of 0. It is 01 if bit MSB-2 is different from the others, which represents a shift of 1. Finally, the shift code is 10 if bit MSB-1 is different from the MSB, which represents a shift of 2. Shift code 11 cannot occur. According to the shift code, the corresponding barrel shifter shifts its result word by 0, 1 or 2 positions. Therefore, the appropriate number of right shifts is performed on each result word to make its guard bits equal its sign bit.

In addition, each corresponding exponent is incremented by the number of shifts using adders 806. Note that the exponent for each data word that is used for computations is the maximum exponent, so, in effect, only the maximum exponent has to be incremented. Therefore, only the maximum exponent is provided to the output section in each butterfly processor 502a–h. It will be readily understood by one of skill in the art, however, that all of the exponents for each data word can be provided to the output section. Thus, to increment the corresponding exponent, the shift code for each result word is added to the maximum exponent via respective adders 806a–d.

When section 800 is used as the input section of butterfly processor 502a, exponent adders 806 are not needed. Rather, the shift code itself is passed through as the exponent.

Figure 9A:
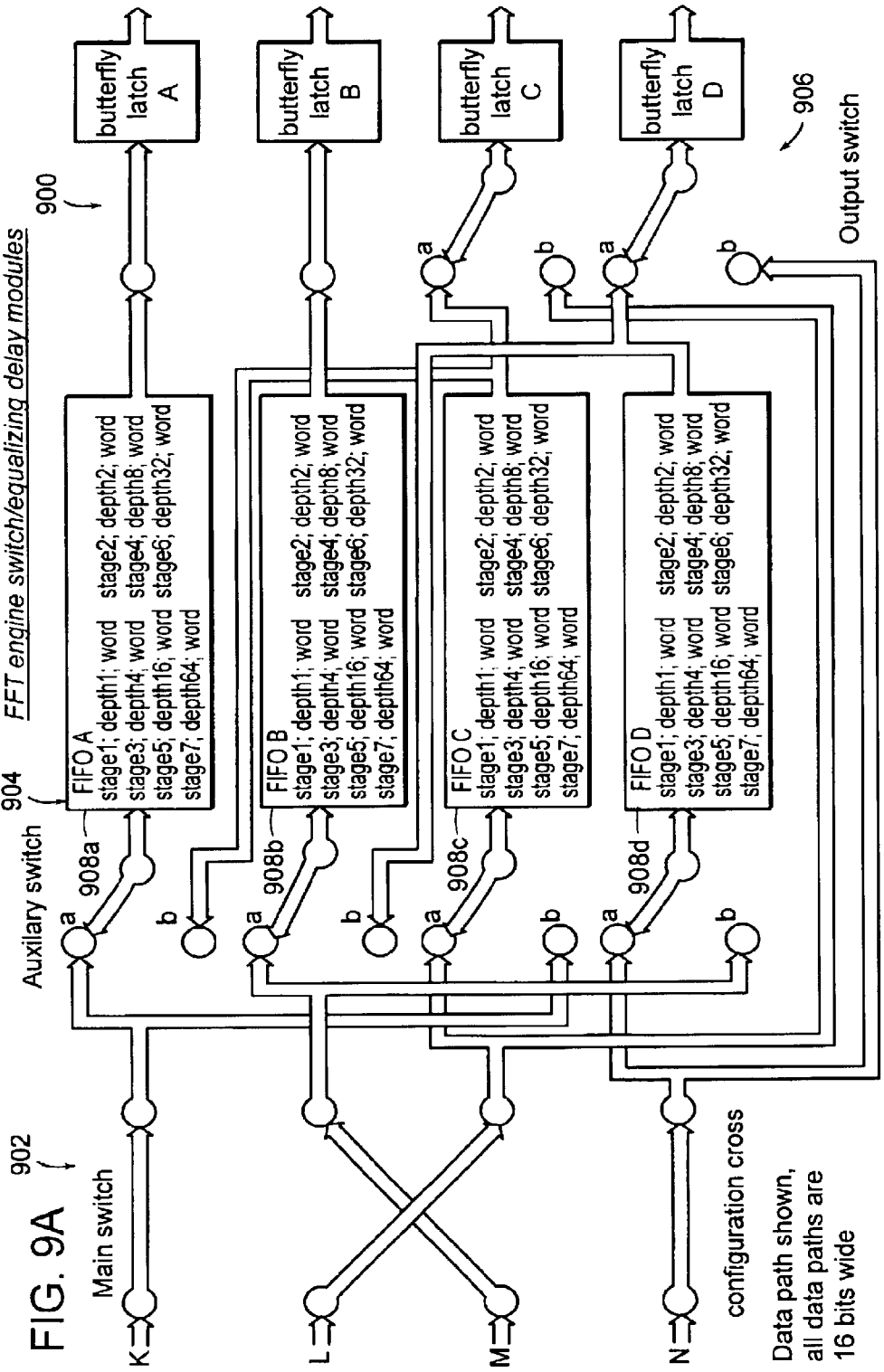
FIGS. 9a–b conceptually illustrates a switch/delay module.
Figure 9B:
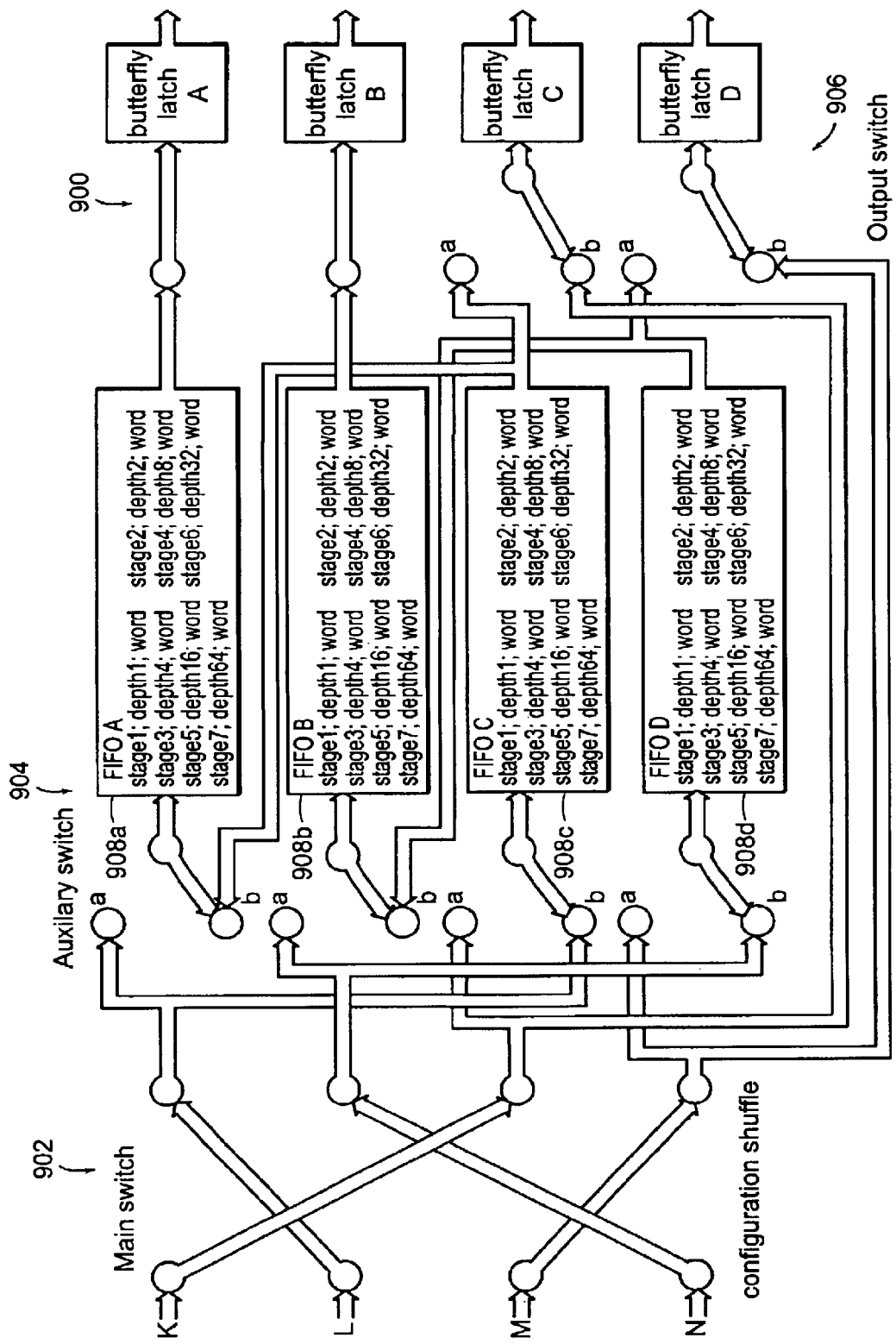

FIGS. 9a–b conceptually illustrate a switch/delay module 900 used to reorder the data for the next butterfly stage. The illustrated switch/delay module 900 provides reordering for an IFFT. Conceptually, switch/delay 900 module comprises: a main switch network 902, an auxiliary switch network 904, a set of four delay modules 908 whose size depends upon the butterfly processor stage, and an output switch network 906. The switch networks 902, 904, and 906 have two positions, "a" and "b", illustrated in FIGS. 9a and 9b respectively. The delay of the first switch/delay module 504a is one (two to the power of zero) and then it doubles for each subsequent switch/delay module, until it reaches 64 for the last switch/delay module 504g.

To obtain the data rearrangement for the Bergland algorithm, switch/delay module 900 switches the order of the four input data items of a particular butterfly processor so as to take data items from the appropriate outputs of the previous butterfly processor, as well as delaying some data items as necessary so that they arrive synchronously in the necessary order for the next butterfly processor in the chain. As described, the switch networks 902, 904, and 906 have two positions, "a" and "b." Switch networks 902, 904, and 906 are in position "a" when the first group of four data items is ready to pass through it. After switch networks 902, 904, and 906 are properly initialized and receive the first four data items, they continue switching between position "a" and "b" in a well defined pattern to insure correct data flow through the corresponding butterfly processor. The switching frequency is the highest for the switch/delay module at the output of the first butterfly unit (i.e., switch/delay module 504a). For this module, the switch networks 902, 904, and 906 change positions every other data set. The switching frequency divides by two for each subsequent switch/delay module.

The design of switch/delay module 900 reuses delay modules 908a and 908b for appropriate data items when in the "b" position. This reuse reduces the latency required to synchronize data items. To understand how switch/delay module 900 properly rearranges the data, while reducing latency, first note that the data element numbers of the four inputs of the first butterfly processor 502a are as follows (from right to left):

```
...12 8  4 0
...13 9  5 1
...14 10 6 2
...15 11 7 3
```

That is, the data elements whose numbers are 0, 1, 2, and 3 (i.e., A3(0), A3(1), A3(2), and A3(3)) are the first four inputs, the data elements whose numbers are 4, 5, 6, and 7 are the second four inputs, etc. This can be seen from FIG. 4a.

To continue, the data element numbers of the four inputs of the second butterfly processor 502b are (from right to left):

```
... 9  8 1 0
... 11 10 3 2
... 13 12 5 4
... 15 14 7 6
```

With this in mind, FIG. 9c conceptually illustrates the data flow from the inputs to the outputs when switch/delay module 900 is the first switch/delay module 504a. As shown, at point 1, the data items on the inputs of switch/delay module 900 are those with element numbers 0, 1, 2, and 3. The switch networks 902, 904, and 906 are initialized to position "a" so that, at point 2, the data items are latched into delays 908. Because of switch network 902, however, data items 2 and 3 are crossed, so that the data items 0, 2, 1, 3 are latched into delays 908a, 908b, 908c, and 908d respectively. When data items 0, 2, 1, and 3 are latched, data items 4, 5, 6, 7 become available on the inputs.

The switch networks 902, 904, and 906 are then placed into position "b" so that delays 908a and 908b are reused by inputting the data items 1 and 3 into these delays respectively. Data items 0 and 2, along with data items 4 and 6 are output, while data items 5 and 7 are input to delays 908c and 908d respectively. As can be seen, this sequence then reoccurs so that the next data items are placed into the proper order.

To understand how latency is reduced, consider that the maximum delay in the first switch/delay module 504a before data items can be processed would typically be 3. The maximum delay doubles for each subsequent switch/delay module 504b–g. Adding up the maximum delays from each interstage switch delay network gives 381 delays.

This number is the pipeline latency, and defines the processor speed in a start/stop scenario. In the actual hardware this number has to be doubled, since the butterfly units take two cycles to perform a computation and the pipeline speed is halved. By reusing delays, however, the total latency is reduced. Reusing delays implies reducing the delay line sizes, ultimately making them equal to the smallest non-zero delay in each particular switch/delay block. All of this means that the total delay or latency is cut by two thirds, going from the original 381 down to 127.

Because one specific switch configuration can provide a direct path from the first butterfly unit to the last, pipeline "stop" registers are preferably introduced at the output of each switch/delay module. These registers increase the latency by 7, since there are seven places where they have to be placed. Doubling the numbers because of the two cycle butterfly computation and taking into account the 128 pipeline clock cycles needed to fully load the output memory with the result data we arrive at 522 input clock cycles needed to complete one IFFT of size 512.

Although the present invention has been shown and described with respect to several embodiments thereof, various changes, omissions and additions to the form and detail thereof, may be made therein, without departing from the spirit and scope of the invention.

For instance, it should be noted that the maximum size FFT is only limited by the number of butterfly elements and the specific arrangement and size of the equalizing delays. Every FFT/IFFT up to the size permitted by these elements can be computed with slight changes in the twiddle addressing mechanism and by tapping the result data out earlier in the process, in the sense of getting the result not from the last butterfly computing unit, but from an intermediate one, e.g. for a 64 FFT this should be butterfly unit 4. Another way to perform a smaller FFT/IFFT is to spread the smaller input data block over the available input memory and fill the gaps with zeros, as in an interpolation digital filtering. This method may be preferable as it does not involve any changes in the hardware, but only a conceptual change in the input data loading and output data collecting. The output result after the FFT/IFFT in this case will be periodic, and one might need to upload only one period.

Also, while the processor has been described with regards to an IFFT, one of skill in the art can readily produce a processor according to the present invention that performs an FFT. In addition, since the FFT goes in reverse order of delays a reconfigurable architecture can also be defined.

Figure 10:
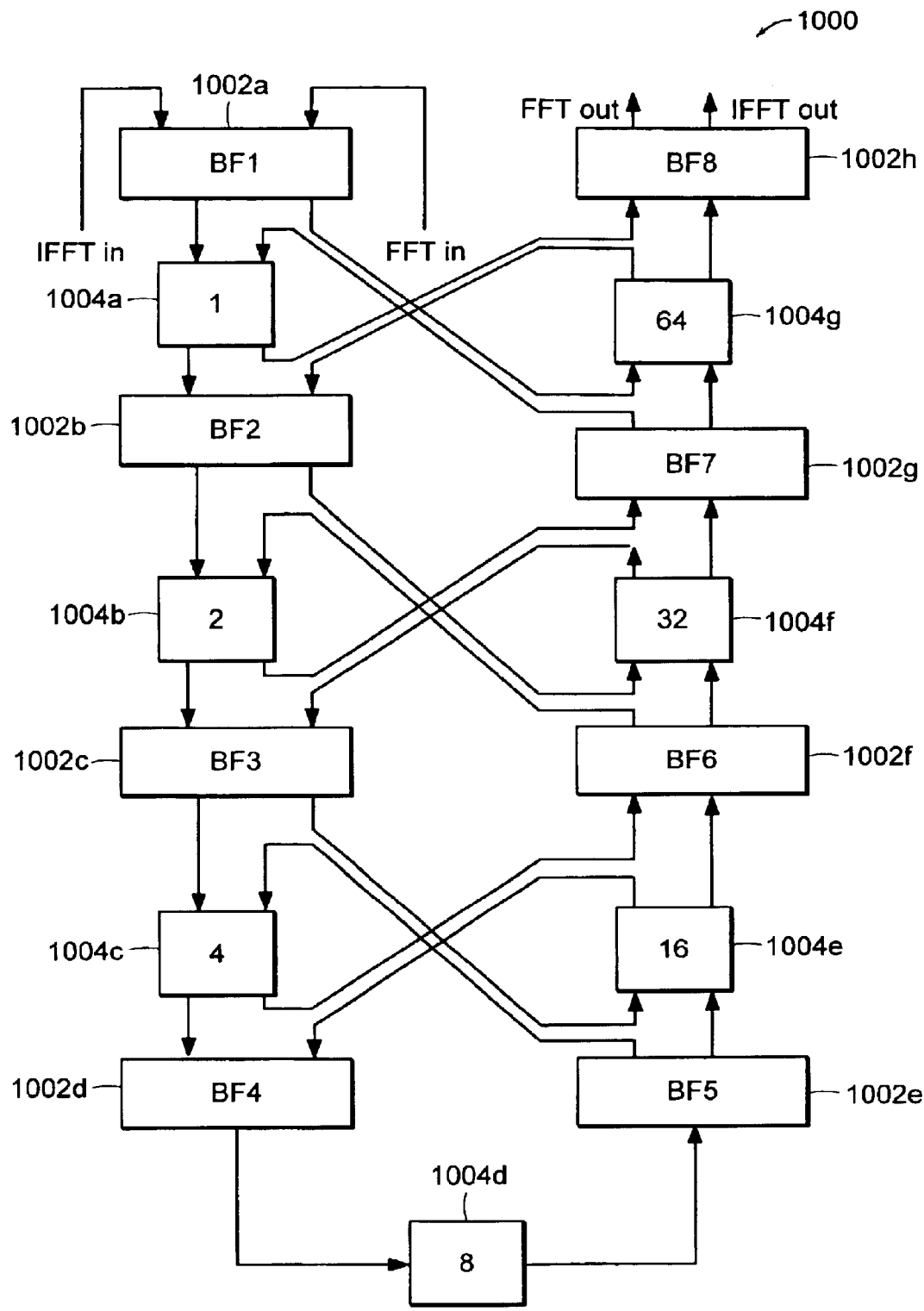
FIG. 10 illustrates a reconfigurable architecture for a real-valued FFT processor according to the present invention.

Such a reconfigurable architecture is illustrated in FIG. 10. The input lines to switch/delay modules 1004 are multiplexed so as to insure the reverse data flow necessary for the forward FFT computation. Twiddle factor tables also have to be exchanged via multiplexers between butterfly processors 1002. Also if it is desired to keep the multiplier at its minimum, butterfly processor 1002h has to be multiplexed with butterfly processor 1002a for a forward FFT, since butterfly processor 1002h processor is multiplierless and the data patterns are reversed for the forward FFT with respect to the IFFT.

The pipelines are implemented with dual ported I/O RAMs (not shown) having the same read and write address counter. Since in a forward FFT the output is in scrambled order, instead of the input like an IFFT, I/O RAMs (not shown) have to be augmented with decoding logic to handle both cases. A new value is written at a positive write pulse edge, after which the read/write address increments and the value available for reading is from that incremented address until the next write pulse positive edge.

The configurations of switch/delay modules 1004 are also changed after the write pulse positive edge, when such change is necessary. When the processor is running in the IFFT mode, the first delay is by one (two to the power of zero) and then it doubles for each subsequent switch-delay block, until it reaches 64 for the last. For the FFT algorithm the reverse delay distribution is valid, that is the first delay is 64 and then they decrease until 1 is reached before the last butterfly processor. To accommodate both the IFFT and FFT, the memories in the delay blocks are designed with the following depths: 64, 32, 16, 8, 16, 32, 64. Each delay line except the middle one 1004d would normally require two taps, one for the FFT and for the IFFT algorithm. This would increase circuit buses and multiplexing circuitry, so another scheme that introduces modulo addressing in the read/write address counter is preferable. In fact, since the modulo is always a power of two, modulo addressing is easily performed by selectively masking high order bits from the address counters (with simple AND gates controlled by a Mode signal).

Figure 11B:
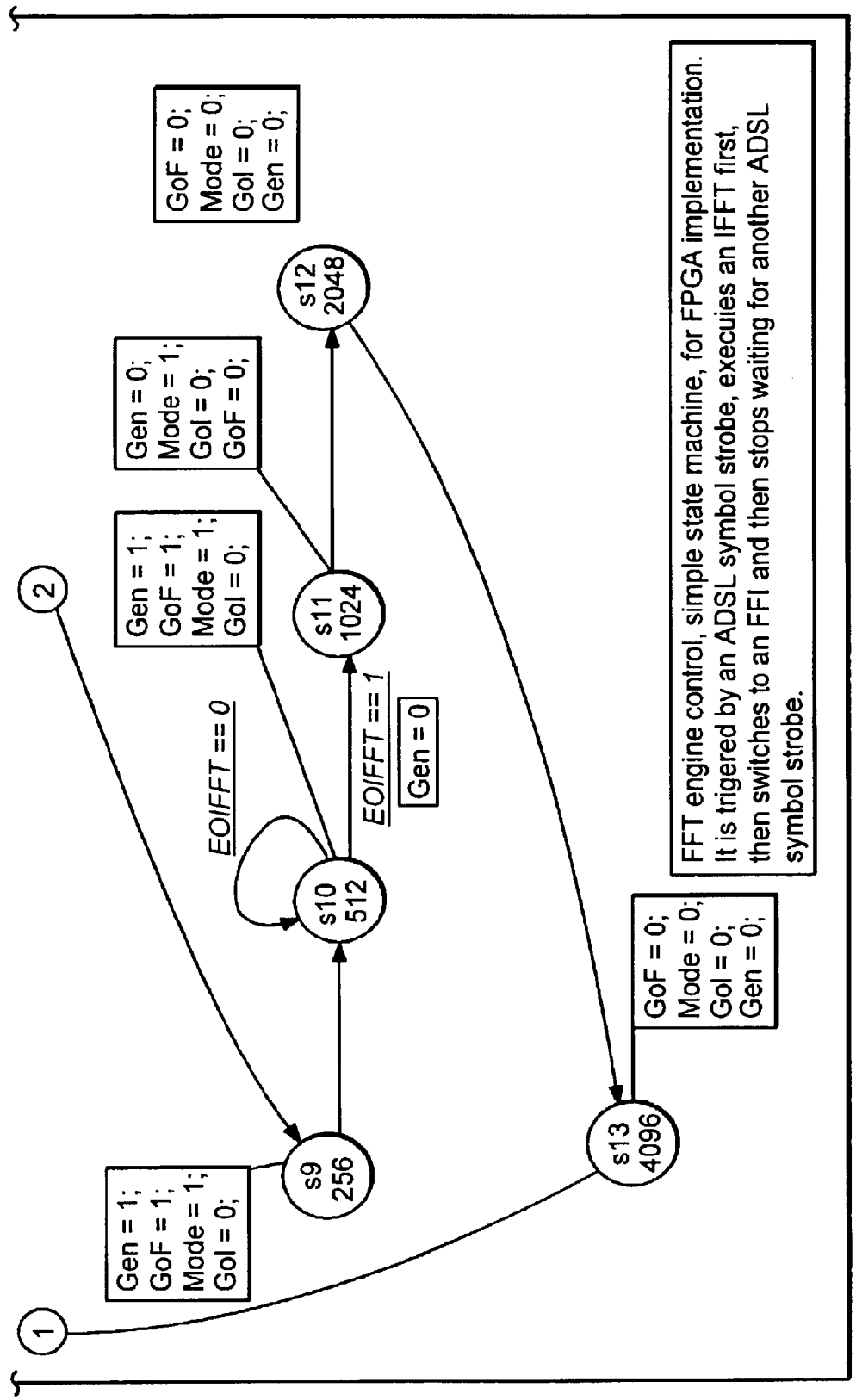
FIG. 11 illustrates the state-transition diagram of the controller for a real-valued FFT processor according to the present invention.

A state machine (not shown), whose state-transition diagram is shown in FIG. 11 controls the operation of the reconfigurable IFFT/FFT processor 1000 when it is an integral part of an ADSL subsystem. Clk is the FFT processor system clock signal. ADSLstrb is the symbol strobe, EOFFT and EOIFFT are signals generated by the processor to inform the rest of the system when a process is finished. Gen is the FFT processor global enable signal, Mode is 0 for an IFFT and 1 for an FFT, GoF and GoI are signals that identify for the input and output memory blocks which process is currently running. This state machine is activated on a symbol strobe, and executes in sequence an IFFT and then an FFT. It then waits for a new symbol strobe to start the same process over again. The example state machine shown is implemented for one channel, but it would be readily apparent to one of skill in the art how to port it to a multichannel environment.

This reconfigurable FFT/IFFT processor 1000 is fully symmetric in its operation, 512 points IFFT and 512 points FFT, and this symmetry cannot be altered without hardware changes. While ideal for symmetric DSL applications, for ADSL CO applications the upstream is the result of a 64-point transform, rather than a 512-point transform. As described above, however, the smaller 64-point transform can be obtained from the 512-point transform by spreading the smaller input data block over the available input memory and fill the gaps with zeros. By insert 7 zero samples after each sample of the 64 point data block to be transformed, the 512-point FFT will produce 4 periods, since the 512 resulting points represent 256 complex values. So the first 128 memory locations of the FFT output memory will contain the correct result. Scaling is not affected by the bigger size of the FFT, because the supplementary FFT gain is exactly compensated for by the decimation process gain factor.

The following are Verilog code snippets also showing example implementations of various components of a real-valued FFT processor according to the principles of the present invention:

Example Butterfly Processor

```
// 'include "fftutil.v"
// ************************************************************************
// Butterfly processor for a combined IFFT/FFT Bergland style butterfly computation.
// Both type 0 and regular type butterflies are supported
module btfly(aout, bout, cout, dout, eaout, ebout, ecout, edout,
      Ain, Bin, Cin, Din, eAin, eBin, eCin, eDin,
         Wre, Wim, Mode, Type, Clk, Gen, Rnd);
// Inputs are four data words and their four bit exponents,
// Outputs are four results and their associated exponents.
// The control inputs are system clock, global clock enable, mode(IFFT/FFT) control
// and butterfly type control. Mode is 0 for IFFT and 1 for FFT.
// Twiddle factor tables are assumed to contain Wre and Win for IFFT and Wim Wre for FFT
    input [15:0] Ain, Bin, Cin, Din;
    input [3:0] eAin, eBin, eCin, eDin;
    input [15:0] Wre, Wim;       // Twiddle factor tables data input
    input   Mode, Type, Clk, Gen;
    input   Rnd;                 // Multiplier rounding control
    output [15:0] aout, bout, cout, dout;
    wire [15:0] aout, bout, cout, dout;
    output [3:0] eaout, ebout, ecout, edout;
    wire [15:0] DAout, DBout, DCout, DDout;
    wire [15:0] DAin, DBin, DCin, DDin, BDMin, BDSub, BDout, BDplus, ACout, ACplus;
    wire [15:0] MuxMult1, MuxMult2, MuxWre, MuxWim;
    wire [3:0] MaxExp;
// wire [15:0]
    wire [31:0] Prod1, Prod2;
    reg [15:0] Platch1, Platch2;
    wire [15:0] Ldiff, Msum, aFFT, cFFT, dFFT, bFFT;
    wire [15:0] LatchMux1, LatchMux2;
    wire    ClkEn;
    reg     Pipephase;
    wire    nRnd;
// initial Pipephase = 1'b0;
/*
    assign aout = Ain; assign bout = Bin; assign cout = Cin; assign dout = Din;
    assign eaout = eAin; assign ebout = eBin; assign ecout = eCin; assign edout = eDin;
*/
//
// First step: normalize all data words to the same(max) exponent
    FftBtflyNormalizer BN1 (DAout, DBout, DCout, DDout, MaxExp, Ain, Bin, Cin, Din,
           eAin, cBin, eCin, eDin);
// Swap B and D at the input of the subtractor according to the Mode(IFFT/FFT)
    Fft2wayMux BDMUX1 (BDMin, DDout, DBout, Mode);
    Fft2wayMux BDMUX2 (BDSub, DBout, DDout, Mode);
    Fft16Sub BDSUB (BDout, BDMin, BDSub, 1'b1);
// The remaining three add/subtracts
    Fft16Add BDAdd (BDplus, DBout, DDout, 1'b0);
    Fft16Sub ACSub (ACout, DAout, DCout, 1'b1);
    Fft16Add ACAdd (ACplus, DAout, DCout, 1'b0);
// Switch in the correct values to the input of the multipliers, according to the Mode
    Fft2wayMux MULTMUX1 (MuxMult1, DBout, ACout, Mode);
    Fft2wayMux MULTMUX2 (MuxMult2, DDout, BDplus, Mode);
// Derive a half main clock period shifted enable for twiddle multiplexers select input
    FftClockEnable CLKEN1 (ClkEn, Clk, Gen);
    always @(posedge Clk) Pipephase <= ~ClkEn;
// Twiddle factors multiplexers control
    Fft2wayMux TWIDMUX1 (MuxWre, Wim, Wre, Pipephase);
    Fft2wayMux TWIDMUX2 (MuxWim, Wre, Wim, Pipephase);
// Two multiplications per clock cycle with muxed twiddle factors
    FftBWMult MULT1 (Prod1, MuxMult1[15], MuxMult1[14:0], MuxWre[15], MuxWre[14:0]);
    FftBWMult MULT2 (Prod2, MuxMult2[15], MuxMult2[14:0], MuxWin[15],
```

-continued

```
MuxWim[14:0]);
// Latch MSBs of multipliers(left shifted to eliminate redundant sign bit) on every Clk
    always @(posedge Clk)
        begin
            Platch1 <= Prod1[30:15];
            Platch2 <= Prod2[30:15];
        end
// Subtract Platch2 from Platch1 with round control
    not (nRnd, Rnd);
    Fft2wayMux LM1 (LatchMux1, Platch2, Platch1, Mode);
    Fft2wayMux LM2 (LatchMux2, Platch1, Platch2, Mode);
    Fft16Sub LSUB (Ldiff, LatchMux1, LatchMux2, nRnd);
// Add Multipliers outputs with round control, usually Rnd should enable ProdX[14]
    Fft16ADD LADD (Msum, Prod1[30:15], Prod2[30:15], Rnd);
// Final additions/subtractions for FFT, executed but not selected for IFFT
    Fft16Add AFFT (aFFT, DAout, Msum, 1'b0);
    Fft16Sub CFFT (cFFT, DAout, Msum, 1'b1);
    Fft16Sub DFFT (dFFT, Ldiff, DCout, 1'b1);
    Fft16ADD BFFT (bFFT, Ldiff, DCout, 1'b0);
// Four four way data selectors select the results to be sent to the overflow control block
// according to the selected Mode(IFFT/FFT) and butterfly type
    Fft4wayMux OUTMUXA (DAin, aFFT, ACplus, ACplus, ACplus, {Mode, Type});
    Fft4wayMux OUTMUXB (DBin, bFFT, BDplus, Ldiff, BDout, {Mode, Type});
    Fft4wayMux OUTMUXC (DCin, cFFT, ACout, BDout, ACout, {Mode, Type});
    Fft4wayMux OUTMUXD (DDin, dFFT, BDout, Msum, BDplus, {Mode, Type});
// Last step: perform overflow control adjustment and exponent correction
    FftOverflowCtrl BN2 (aout_, bout_, cout_, dout_, eaout, ebout, ecout, edout,
            DAin, BDin, DCin, DDin, MaxExp);
    assign aout = aout_; assign bout = bout_; assign cout = cout_; assign dout = dout_;
//
endmodule
    Example Implementation Of The First Stage Of The FFT Engine Computing Pipeline'include "twidare.v"
'include "twidaim.v"
'include "swdly17.v"
'include "swdly26.v"
module ffta(Aout, Bout, Cout, Dout, Ain, Bin, Cin, Din,
    Clk, Gen, Mode, Taddr, abA, abB, tB, RND);
output [19:0] Aout, Bout, Cout, Dout;     // FIFOs outputs to next stage
input [19:0] Ain, Bin, Cin, Din;
input   Clk, Gen, Mode;    // Control signals
input   RND;
input   abA, abB;          // Switches control
input [6:0] Taddr;         // Twiddle tables address
input   tB;
wire [15:0] CoeffBR, CoeffBI;
wire [19:0] DAout, DBout, DCout, DDout;
wire [15:0] aoutA, boutA, coutA, doutA;
wire [3:0]  eaoutA, eboutA, ecoutA, edoutA;
    swdly17 SWD17 (DAout, DBout, DCout, DDout,
        Ain, Bin, Cin, Din, Mode, abA, Gen, Clk);
    btfly BTA (aoutA, boutA, coutA, doutA, eaoutA, eboutA, ecoutA, edoutA,
            DAout[15:0], DBout[15:0], DCout[15:0], DDout[15:0],
            DAout[19:16], DBout[19:16], DCout[19:16], DDout[19:16],
                CoeffBR, CoeffBI, Mode, tB, Clk, Gen, RND);
        swdly26 SWD26 (Aout, Bout, Cout, Dout,
            {eaoutA, aoutA}, {eboutA, boutA},
            {ecoutA, coutA}, {edoutA, doutA},
                Mode, abB, Gen, Clk);
        twidare T1 ({Mode, Taddr}, CoeffBR);
        twidaim T2 ({Mode, Taddr}, CoeffBI);
//
endmodule
        Example Interconnection Between All Computing Modules In The FFT Engine 'include "fftutils.v"
'include "btfly.v"
'include "adrdecod.v"
'include "qrama.v"
'include "qrams.v"
'include "fftin.v"
'include "ffta.v"
'include "fftb.v"
'include "fftc.v"
'include "fftd.v"
'include "ffte.v"
'include "fftout.v"
module ffproc (Sinif, Sinclkif, Frameinif, Sinf, Sinclkf, Frameinf, Strb, Clk, RND,
```

```
                Soutif, Soutclkif, Frameoutif, Soutf, Soutclkf, Frameoutf,
                Scaleif, Scalef, Mode, Gen, Pipe, fbuf, ifbuf, Goif, Gof,
                   tA, tB, tC, tD, tE, tF, tG, tH, abA, abB, abC, abD, abE, abF, abG,
RST);
// Circuit I/Os in a single FPGA implementation
input     Clk, RND, RST, Strb;
input     Sinif, Sinf, Sinclkif, Sinclkf, Frameinif, Frameinf;
input     Soutclkf, Frameoutf, Soutclkif, Frameoutif;
input [3:0] Scaleif, Scalef;
output    Soutf, Soutif;
// Outputs for testing
output    Gof, Goif, Mode, Gen, fbuf, ifbuf;
output    tA, tB, tC, tD, tE, tF, tG, tH,
              abA, abB, abC, abD, abE, abF, abG, Pipe;
// Internal wiring for a single FPGA implementation
// or PCB wiring for a multi-FPGA implementation (7 Altera - EP1K1000 series)
// For multi-FPGA implementation some inputs from above must be duplicates
// in each FPGA, e.g. Clk, Mode, RND, Strb. Some of the testing outputs become
// inputs for the FPGAs, e.g. Gof, Goif go to FPGA#1(the input one),
// abA, abB go to FPGA#2, abC goes to FPGA#3, etc.
wire [6:0] acA, acB, acC, acD, acE, acF, acG, acH;
wire [19:0] Aout_in, Bout_in, Cout_in, Dout_in;   // FIFOs outputs to next stage
    wire [19:0] Aout_a, Bout_a, Cout_a, Dout_a;   // FIFOs outputs to next stage
// wire [19:0] Ain, Bin, Cin, Din; These would come from FPGA#1, Aout_in etc.
    wire [19:0] Aout_b, Bout_b, Cout_b, Dout_b;   // FIFOs outputs to next stage
// wire [19:0] Ain, Bin, Cin, Din; These would come from FPGA#2, Aout_a etc.
    wire [19:0] Aout_c, Bout_c, Cout_c, Dout_c;   // FIFOs outputs to next stage
// wire [19:0] Ain, Bin, Cin, Din; These would come from FPGA#2, Aout_b etc.
    wire [19:0] Aout_d, Bout_d, Cout_d, Dout_d;   // FIFOs outputs to next stage
// wire [19:0] Ain, Bin, Cin, Din; These would come from FPGA#2, Aout_c etc.
    wire [15:0] Aout_e, Bout_e, Cout_e, Dout_e;   // FIFOs outputs to next stage
// wire [19:0] Ain, Bin, Cin, Din; These would come from FPGA#2, Aout_d etc.
// wire [15:0] Ain, Bin, Cin, Din; These would come from FPGA#2, Aout_e etc.
// The processor structure written to emphasize the linear pipeline data flow
        fftin FIN (Aout_in, Bout_in, Cout_in, Dout_in, Sinf, Sinclkf, Frameinf,
             Strb, fbuf, ifbuf, Sinif, Sinclkif, Frameinif,
             Clk, Gen, Mode, acA, tA, RND, Gof, Goif);
        ffta FA (Aout_a, Bout_a, Cout_a, Dout_a,
             Aout_in, Bout_in, Cout_in, Dout_in,
             Clk, Gen, Mode, acB, abA, abB, tB, RND);
        fftb FB (Aout_b, Bout_b, Cout_b, Dout_b,
             Aout_a, Bout_a, Cout_a, Dout_a,
             Clk, Gen, Mode, acC, acD, abC, tC, tD, RND);
        fftc FC (Aout_c, Bout_c, Cout_c, Dout_c,
             Aout_b, Bout_b, Cout_b, Dout_b,
             Clk, Gen, Mode, acE, abD, abE, tE, RND);
        fftd FD (Aout_d, Bout_d, Cout_d, Dout_d,
             Aout_c, Bout_c, Cout_c, Dout_c,
             Clk, Gen, Mode, acF, acG, abF, tF, tG, RND);
        ffte FE (Aout_e, Bout_e, Cout_e, Dout_e,
             Aout_d, Bout_d, Cout_d, Dout_d,
             Clk, Gen, Mode, acH, abG, tH, RND, Scalef, Scaleif);
        fftout FOUT (Aout_e, Bout_e, Cout_e, Dout_e,
             Soutf, Soutclkf, Frameoutf, Strb, Soutif, Soutclkif, Frameoutif,
             Clk, Gen, Mode, Gof, Goif,
             acA, acB, acC, acD, acE, acF, acG, acH,
             tA, tB, tC, tD, tE, tF, tG, tH,
             abA, abB, abC, abD, abE, abF, abG, Pipe, RST);
endmodule
```

Example Implementation Of The Last Stage Of The FFT Engine

```
'include "ifftramo.v"
'include "fftramo.v"
module fftout(Ain, Bin, Cin, Din, Soutf, Sclkf, Framef, Strb,
        Soutif, Sclkif, Frameif, Clk, Gen, Mode, Gof, Goif,
        acA, acB, acC, acD, acE, acF, acG, acH,
        tA, tB, tC, tD, tE, tF, tG, tH,
        abA, abB, abC, abD, abE, abF, abG, Pipe, RST);
input [15:0] Ain, Bin, Cin, Din;
input     Clk;        // Main clock
input     Sclkf, Framef, Strb;   // Serial input, Serial Clock, Serial frame, Symbol strobe
output    Soutf, Soutif, Mode, Gen;
input     Sclkif, Frameif, RST;
output    Gof, Goif;
output [6:0] acA, acB, acC, acD, acE, acF, acG, acH;
output    tA, tB, tC, tD, tE, tF, tG, tH,
              abA, abB, abC, abD, abE, abF, abG, Pipe;
    wire      eoifft, eofft, EOFFT, WRenIfft, WrenFft;
//
```

-continued

```
    ifftramo IFFTOUTRAM (Ain, Bin, Cin, Din, Soutif, Sclkif, Frameif,
        Strb, Clk, Gen, WRenIfft, eoifft);
//
//
    fftramo FFTOUTRAM (Ain, Bin, Cin, Din, Soutf, Sclkf, Framef,
        Strb, Clk, Gen, WRenFft, eofft);
//
    ffctrl FCTRL (acA, acB, acC, acD, acE, acF, acG, acH, tA, tB, tC, tD, tE, tF, tG, tH,
        abA, abB, abC, abD, abE, abF, abG, Pipe, Clk, Gen, Mode, EOFFT);
//
    WrResult IFFTWR (Clk, Gen, Goif, EOFFT, WRenIfft);
    WrResult FFTWR (Clk, Gen, Gof, EOFFT, WRenFft);
//
    fft_fsm SYMBOL (Strb, Clk, eofft, eoifft, Gen, Gof, Goif, Mode, RST);
//
endmodule
```

Example Implementation Of The Input Memory for FFT Processing

```
module fftrami (Pipe0, Pipe1, Pipe2, Pipe3, Sin, Sclk, Frame, Strb, Clk, Gen, Go, full);
output [15:0] Pipe0, Pipe1, Pipe2, Pipe3;   // Output data buses
input    Sin, Sclk, Frame, Strb, Clk, Gen, Go;
output   full;
wire     ClkEn;
reg [15:0] SerialIn, SerialLatch;
reg [9:0] Waddr; // Was [10:0]
reg [6:0] Raddr; // Was [7:0]
reg      Fdly1, Fdly2, Fdly3;
wire [3:0] Wctrl;
wire     WRen;
reg      ping;
wire     pong;
wire     nFdly2;
    always @(posedge Strb)
    ping <= ~ping;
    not (pong, ping);
    not (nFdly2, Fdly2);
// and (WRen, Frame, Go);
// and (WRen, Fdly1, Go);
    and (WRen, Fdly1, nFdly2);   // write pulse for the ACEX RAM before address change
    assign full = Waddr[9];   // Was Waddr[10]
    FftDeMux4 WMUX (Wctrl, WRen, Waddr[8:7]);
    always @(negedge Sclk)
    begin
        SerialIn[15:1] <= SerialIn[14:0];
        SerialIn[0] <= Sin;
          end
    always @(posedge Strb or posedge Sclk)
    if (Strb == 1)
      begin
        Fdly1 <= 1;
            Fdly2 <= 1;
            Fdly3 <= 1;
        end
      else
        begin
        Fdly1 <= Frame;
            Fdly2 <= Fdly1;
            Fdly3 <= Fdly2;
        end
    always @(Posedge Frame)
    SerialLatch <= SerialIn;
    always @(posedge Strb or posedge Fdly3)
    if (Strb)
        Waddr <= 0;
      else
    Waddr <= Waddr + 1;
    FftClockEnable CLKEN (ClkEn, Clk, Gen);
    always @(posedge Clk or posedge Strb)
      if (Strb)
          Raddr <= 0;
        else
      if (ClkEn == 1 && Go == 1)
          Raddr <= Raddr + 1;
    qrama RAM0 (SerialLatch, {ping Waddr[6:0]}, {pong, Raddr}, Wctrl[0], Pipe0);
    qrama RAM1 (SerialLatch, {ping Waddr[6:0]}, {pong, Raddr}, Wctrl[1], Pipe1);
    qrama RAM2 (SerialLatch, {ping Waddr[6:0]}, {pong, Raddr}, Wctrl[2], Pipe2);
    qrama RAM3 (SerialLatch, {ping Waddr[6:0]}, {pong, Raddr}, Wctrl[3], Pipe3);
endmodule
```

Example Switch/Delay Module

```verilog
'include "infifoc2.v"
// ***********************************************************************
// Switch delay block for IFFT/FFT. This block has the most complicated wiring.
// It's intimately tied to the nature of the FFT/IFFT algorithm used, in this case
// Bergland's real input algorithm. It also provides for special data routing to
// substantially reduce the pipeline delay inherent to that kind of Fourier processors.
// Also this block data is 20 bit wide, because it includes the data words and their
// exponents, that have to move synchronously. Since the data is 20 bits wide, the four way
// multiplexers are different from the ones used so far. Seven almost identical modules
// are needed for 512 points real input IFFT/FFT. The modules differ only by the location
// where the FIFOs are tapped, and by FIFOs depth. Because of symmetry, there are
// only four module types
module swdly53(Aout, Bout, Cout, Dout, Ain, Bin, Cin, Din, Mode, ab_pos, Gen, Clk);
// The data I/O's are obvious, Mode selects IFFT mode(0) or FFT mode(1)
// ab_pos controls the switch to position 'a', conceptually up or position 'b',
// conceptually down. Gen is the global clock enable and Clk is the clock input
    input [19:0] Ain, Bin, Cin, Din;
    input        Mode, ab_pos, Gen, Clk;
    output [19:0] Aout, Bout, Cout, Dout;
    reg [19:0] Aout, Bout, Cout, Dout;
    wire     ClkEn;//, DClkEn;
    parameter ctaps = 3;
    wire [19:0] Xaout, Xbout, Xcout, Xdout; // From the input switch
    wire [19:0] Iaout, Ibout, Icout, Idout; // From the intermediate switch
    wire [19:0] Taout, Tbout, Tcout, Tdout; // Output from the selected FIFO tap
    wire [19:0] Alatch, Blatch, Clatch, Dlatch;
    reg [ctaps:0] fifoaddr;
    wire [ctaps-2:0] modeaddr;
    wire     wren;
//  reg      DGen;
    wire     nMode;
// wire     nClk;
    not (nMode, Mode);
    and (modeaddr[0], fifoaddr[2], nMode); and (modeaddr[1], fifoaddr[3], nMode);
// Instantiate the FIFOs
    infifoc2 FIFO0 (Iaout, {modeaddr, fifoaddr[1:0]}, {modeaddr, fifoaddr[1:0]}, wren, Clk,
Taout);
    infifoc2 FIFO1 (Ibout, {modeaddr, fifoaddr[1:0]}, {modeaddr, fifoaddr[1:0]}, wren, Clk,
Tbout);
    infifoc2 FIFO2 (Icout, {modeaddr, fifoaddr[1:0]}, {modeaddr, fifoaddr[1:0]}, wren, Clk,
Tcout);
    infifoc2 FIFO3 (Idout, {modeaddr, fifoaddr[1:0]}, {modeaddr, fifoaddr[1:0]}, wren, Clk,
Tdout);
// initial ClkEn = 0;
// Cross or data shuffle switch
    Fft4wayMux20 XA (Xaout, Cin, Ain, Bin, Ain, {Mode, ab_pos});
    Fft4wayMux20 XB (Xbout, Ain, Cin, Din, Cin, {Mode, ab_pos});
    Fft4wayMux20 XC (Xcout, Din, Bin, Ain, Bin, {Mode, ab_pos});
    Fft4wayMux20 XD (Xdout, Bin, Din, Cin, Din, {Mode, ab_pos});
// Latch after shuffle data
// always @(negedge DClkEn) DGen <= Gen;
// FftClockEnable CLKEN0 (DClkEn, Clk, Gen);
// FftClockEnable CLKEN1 (ClkEn, Clk, DGen);
    FftClockEnable CLKEN1 (ClkEn, Clk, Gen);
    always @(posedge Clk)
        begin
            if (ClkEn)
              fifoaddr <= fifoaddr + 1;
            end
    always @(posedge Clk)
        begin
          if (ClkEn)
              begin
                Aout <= Alatch;
                  Bout <= Blatch;
                  Cout <= Clatch;
                  Dout <= Dlatch;
            end
        end
// not (nClk, Clk);
// and (wren, ClkEn, nClk);    // Write pulse to FIFOs
    assign wren = ClkEn;
// Intermediate switches
    Fft4wayMux20 IA (Iaout, Tbout, Xaout, Tcout, Xaout, {Mode, ab_pos});
    Fft4wayMux20 IB (Ibout, Xaout, Xbout, Tdout, Xbout, {Mode, ab_pos});
    Fft4wayMux20 IC (Icout, Tdout, Xcout, Xaout, Xcout, {Mode, ab_pso});
    Fft4wayMux20 ID (Idout, Xcout, Xdout, Xbout, Xdout, {Mode, ab_pos});
// End switches
```

-continued

```
    assign Alatch = Taout;
    Fft4wayMux20 EB (Blatch, Xbout, Tbout, Tbout, Tbout, {Mode, ab_pos});
    Fft4wayMux20 EC (Clatch, Tcout, Tcout, Xcout, Tcout, {Mode, ab_pos});
    Fft4wayMux20 ED (Dlatch, Xdout, Tdout, Xdout, Tdout, {Mode, ab_pos});
endmodule
```

Example implementation of the input memory for IFFT processing

Example Implementation Of The Input Memory For IFFT Processing

```
module ifftrami(Pipe0, Pipe1, Pipe2, Pipe3, Sin, Sclk, Frame, Strb, Clk, Gen, Go, full);
output [15:0] Pipe0, Pipe1, Pipe2, Pipe3;      // Output data buses
input     Sin, Sclk, Frame, Strb, Clk, Gen, Go;
output    full;
wire      ClkEn;
reg [15:0] SerialIn, SerialLatch;
reg [9:0] Waddr;       // Was [10:0]
reg [6:0] Raddr;       // Was [7:0]
reg         Fdly1, Fdly2, Fdly3;
wire [3:0] Wctrl;
wire [8:0] Baddr;
wire        WRen;
reg       ping;
wire      pong;
wire      nFdly2;
always @(posedge Strb)
    ping <= ~ping;
    not (pong, ping);
    not (nFdly2, Fdly2);
// and (WRen, Frame, Go);
// and (WRen, Fdly1, Go);
    and (WRen, Fdly1, nFdly2); // write pulse for the ACEX RAM before address change
    assign full = Waddr[9]; // Was Waddr[10]
    adrdecod BTAB (Waddr[8:0], Baddr);
    FftDeMux4 WMUX (Wctrl, WRen, Baddr[1:0]);
always @(negedge Sclk)
    begin
        SerialIn[15:1] <= SerialIn[14:0];
        SerialIn[0] <= Sin;
        end
always @(posedge Strb or posedge Sclk)
    if (Strb == 1)
        begin
            Fdly1 <= 1;
                Fdly2 <= 1;
                Fdly3 <= 1;
            end
        else
        begin
            Fdly1 <= Frame;
                Fdly2 <= Fdly1;
                Fdly3 <= Fdly2;
        end
always @(posedge Frame)
SerialLatch <= SerialIn;
always @(posedge Strb or posedge Fdly3)
    if (Strb)
        Waddr <= 0;
    else
    Waddr <= Waddr + 1;
FftClockEnable CLKEN (ClkEn, Clk, Gen);
always @(posedge Clk or posedge Strb)
    if (Strb)
    Raddr <= 0;
        else
    if (ClkEn == 1 && Go == 1)
        Raddr <= Raddr + 1;
    qrama RAM0 (SerialLatch, {ping, Baddr[8:2]}, {pong, Raddr}, Wctrl[0], Pipe0);
    qrama RAM1 (SerialLatch, {ping, Baddr[8:2]}, {pong, Raddr}, Wctrl[1], Pipe1);
    qrama RAM2 (SerialLatch, {ping, Baddr[8:2]}, {pong, Raddr}, Wctrl[2], Pipe2);
    qrama RAM3 (SerialLatch, {ping, Baddr[8:2]}, {pong, Raddr}, Wctrl[3], Pipe3);
endmodule
```

Example Output Normalizing Circuit

```
//*******************************************************************************
// Output memory scaling shifter. The FFT/IFFT result block has an exponent associated
```

```
// with each data word. This dependency has to be removed for subsequent fixed point only
// handling of the result. The natural way to accomplish this is to make all data words
// with zero exponents. Since exponents in the hybrid floating point system used meant
// always shift right, to make them vanish, a left shift is required by the amount shown
// by the exponent value(exponent values are always positive in this system). A subtractor
// is provided to account for the IFFT/FFT normalization factor. This shifter is saturating
// its output if an out of range numerical value is detected. The shifter is implemented
// as a right shifter only with I/O flipping if a left shift is needed. Input flipper is a
// two way multiplexer, and output flipper is a four way multiplexer incorporating the
// two saturation values. That way area saving are accomplished with a one multiplexer level
// speed penalty only, since an output saturator would anyway be necessary if a true
// left/right barrel shifter was implemented. For max speed, 32, 18 input multiplexers would
// be necessary, while this implementation uses 16, 16 input multiplexers,
// 16 two input multiplexers and 16 four input multiplexers.
module FftOutShift(Dout, Din, Ein, Scale);
    input [15:0] Din;         // Unnormalized shifter input
    input [3:0] Ein;          // exponent input
    input [3:0] Scale;        // FFT/IFFT scale factor
    output [15:0] Dout;       // Normalized shifter data output
    wire [3:0] Diff;          // Exp - Scale result
    wire [3:0] SumA;
    wire [3:0] Nout;
    wire [15:0] Fout;         // Flipped data out
    wire [15:0] Sout;         // Shifted data out
    wire [3:0] lnum;          // Number of leading equal bits
    wire BoutA, coutA, coutB, coutC, signA, signB, Decr, AllZ, FlipA, NAllZ; //, signAbs;
    wire SignBuf, OvFlow, xc3, xc2, xc1, xc0, ce0, ce1, ce2, ce3, ce4;
    wire [15:0] lead;
// Implementing an absolute value circuit after the first subtraction
    Fftsub4 S1 (BoutA, Diff, Ein, Scale, 1'b1);
    FftFullAdder A1 (coutA, signA, 1'b0, 1'b1, BoutA); // sign extension
// Not supported by Aldec
// xor XR[3:0] (Nout, Diff, signA);   // Invert result bits, without the signA itself
// These are universally supported
    xor XR0 (Nout[0], Diff[0], signA);
    xor XR1 (Nout[1], Diff[1], signA);
    xor XR2 (Nout[2], Diff[2], signA);
    xor XR3 (Nout[3], Diff[3], signA);
// Detect an all zero subtraction result. If not all zero and the sign is positive,
// subtract 1 from the result shift(since the shift will be to the left). The flip
// output data is "pre" shifted by one to the left.
    or (AllZ, signA, Diff[3], Diff[2], Diff[1], Diff[0]);
    assign Decr = AllZ & ~signA;
    nor (NAllZ, signA, Diff[3], Diff[2], Diff[1], Diff[0]);
    assign FlipA = NAllZ|signA;
// or (signAbs, Decr, signA); // Prepare a subtraction if signA is 1(negative) or Decr(ement)
    Fftadd4 A2 (coutB, SumA, {4{Decr}}, Nout, signA /*signAbs*/);
    FftFullAdder A3 (coutC, signB, Decr, 1'b0, coutB); // Redundant
// Input data flipping to the barrel right shifter
    Fft2wayMux    FMX       (Fout,    Din,
{1'b0,Din[0],Din[1],Din[2],Din[3],Din[4],Din[5],Din[6],Din[7],
        Din[8],Din[9],Din[10],Din[11],Din[12],Din[13],Din[14]},FlipA);
// Barrel shifting
    FftBarrelRight BSH (Sout, Fout, SumA);
// Leading zero(or one) detect and encode
// not (SignBuf, signA);
    not (SignBuf, Din[15]);
    assign lead[15] = (SignBuf^Din[15]) & (~SignBuf^Din[14]);
    assign lead[14] = (SignBuf^Din[15]) & (SignBuf^Din[14]) & (~SignBuf^Din[13]);
    assign lead[13] = (SignBuf^Din[15]) & (SignBuf^Din[14]) & (SignBuf^Din[13])
        & (~SignBuf^Din[12]);
    assign lead[12] = (SignBuf^Din[15]) & (SignBuf^Din[14]) & (SignBuf^Din[13])
        & (SignBuf^Din[12]) & (~SignBuf^Din[11]);
    assign lead[11] = (SignBuf^Din[15]) & (SignBuf^Din[14]) & (SignBuf^Din[13])
        & (SignBuf^Din[12]) & (SignBuf^Din[11]) & (~SignBuf^Din[10]);
    assign lead[10] = (SignBuf^Din[15]) & (SignBuf^Din[14]) & (SignBuf^Din[13])
        & (SignBuf^Din[12]) & (SignBuf^Din[11]) & (SignBuf^Din[10])
            & (~SignBuf^Din[9]);
    assign lead[9] = (SignBuf^Din[15]) & (SignBuf^Din[14]) & (SignBuf^Din[13])
        & (SignBuf^Din[12]) & (SignBuf^Din[11]) & (SignBuf^Din[10])
        & (SignBuf^Din[9]) & (~SignBuf^Din[8]);
    assign lead[8] = (SignBuf^Din[15]) & SignBuf^Din[14]) & (SignBuf^Din[13])
        & (SignBuf^Din[12]) & (SignBuf^Din[11]) & (SignBuf^Din[10])
        & (SignBuf^Din[9]) & (SignBuf^Din[8]) & (~SignBuf^Din[7]);
    assign lead[7] = (SignBuf^Din[15]) & (SignBuf^Din[14]) & (SignBuf^Din[13])
        & (SignBuf^Din[12]) & (SignBuf^Din[11]) & (SignBuf^Din[10])
        & (SignBuf^Din[9]) & (SignBuf^Din[8]) & (SignBuf^Din[7])
        & (~SignBuf^Din[6]);
    assign lead[6] = (SignBuf^Din[15]) & (SignBuf^Din[14]) & (SignBuf^Din[13])
        & (SignBuf^Din[12]) & (SignBuf^Din[11]) & (SignBuf^Din[10])
```

```
            & (SignBuf^Din[9]) & (SignBuf^Din[8]) & (SignBuf^Din[7])
            & (SignBuf^Din[6]) & (~SignBuf^Din[5]);
   assign lead[5] = (SignBuf^Din[15]) & (SignBuf^Din[14]) & (SignBuf^Din[13])
            & (SignBuf ^ Din[12]) & (SignBuf ^ Din[11]) & (SignBuf ^
Din[10])
            & (SignBuf ^ Din[9]) & (SignBuf ^ Din[8]) & (SignBuf ^
Din[7])
            & (SignBuf ^ Din[6]) & (SignBuf ^ Din[5]) & (~SignBuf ^
Din[4]);
   assign lead[4] = (SignBuf^Din[15]) & (SignBuf^Din[14]) & (SignBuf^Din[13])
            & (SignBuf ^ Din[12]) & (SignBuf ^ Din[11]) & SignBuf ^
Din[10])
            & (SignBuf ^ Din[9]) & (SignBuf ^ Din[8]) & SignBuf ^
Din[7])
            & (SignBuf ^ Din[6]) & (SignBuf ^ Din[5]) & SignBuf ^
Din[4])
            & (~SignBuf^Din[3]);
   assign lead[3] = (SignBuf^Din[15]) & (SignBuf^Din[14]) & (SignBuf^Din[13])
            & (SignBuf ^ Din[12]) & (SignBuf ^ Din[11]) & (SignBuf ^
Din[10])
            & (SignBuf ^ Din[9]) & (SignBuf ^ Din[8]) & (SignBuf ^
Din[7])
            & (SignBuf ^ Din[6]) & (SignBuf ^ Din[5]) & (SignBuf ^
Din[4])
            & (SignBuf^Din[3]) & (~SignBuf^Din[2]);
   assign lead[2] = (SignBuf^Din[15]) & (SignBuf^Din[14]) & (SignBuf^Din[13])
            & (SignBuf ^ Din[12]) & (SignBuf ^ Din[11]) & (SignBuf ^
Din[10])
            & (SignBuf ^ Din[9]) & (SignBuf ^ Din[8]) & (SignBuf ^
Din[7])
            & (SignBuf ^ Din[6]) & (SignBuf ^ Din[5]) & (SignBuf ^
Din[4])
            & (SignBuf ^ Din[3]) & (SignBuf ^ Din[2]) & (~SignBuf ^
Din[1]);
   assign lead[1] = (SignBuf^Din[15]) & (SignBuf^Din[14]) & (SignBuf^Din[13])
            & (SignBuf ^ Din[12]) & (SignBuf ^ Din[11]) & (SignBuf ^
Din[10])
            & (SignBuf ^ Din[9]) & (SignBuf ^ Din[8]) & (SignBuf ^
Din[7])
            & (SignBuf ^ Din[6]) & (SignBuf ^ Din[5]) & (SignBuf ^
Din[4])
            & (SignBuf ^ Din[3]) & (SignBuf ^ Din[2]) & (SignBuf ^
Din[1])
            & (~SignBuf^Din[0]);
   assign lead[0] = (SignBuf^Din[15]) & (SignBuf^Din[14]) & (SignBuf^Din[13])
            & (SignBuf ^ Din[12]) & (SignBuf ^ Din[11]) & (SignBuf ^
Din[10])
            & (SignBuf ^ Din[9]) & (SignBuf ^ Din[8]) & (SignBuf ^
Din[7])
            & (SignBuf ^ Din[6]) & (SignBuf ^ Din[5]) & (SignBuf ^
Din[4])
            & (SignBuf ^ Din[3]) & (SignBuf ^ Din[2]) & (SignBuf ^
Din[1])
            & (SignBuf ^ Din[0]);
   assign lnum[0] = lead[14]|lead[12]|lead[10]|lead[8]|lead[6]|lead[4]|lead[2]|lead[0];
   assign lnum[1] = lead[13]|lead[12]|lead[9]|lead[8]|lead[5]|lead[4]|lead[1]|lead[0];
   assign lnum[2] = lead[11]|lead[10]|lead[9]|lead[8]|lead[3]|lead[2]|lead[1]|lead[0];
   assign lnum[3] = lead[7]|lead[6]|lead[5]|lead[4]|lead[3]|lead[2]|lead[1]|lead[0];
// Compare shift magnitude and leading bit position
/*
   assign xc3 = ~((~lnum[3] & Diff[3])|(lnum[3] & ~Diff[3]));
   assign xc2 = ~((~lnum[2] & Diff[2])|(lnum[2] & ~Diff[2]));
   assign xc1 = ~((~lnum[1] & Diff[1])|(lnum[1] & ~Diff[1]));
// Overflow will occur if the shifts(left) Diff are more than the number of leading bits, lnum
   assign OvFlow = (lnum[3] & ~Diff[3])|(xc3 & lnum[2] & ~Diff[2])
        |(xc3 & xc2 & lnum[1] & ~Diff[1])
        |(xc3 & xc2 & xc1 & lnum[0] & ~Diff[0]);
*/
   FftFullSubtractor Sub0 (cel0, xc0, lnum[0], Nout[0], signA);
   FftFullSubtractor Sub1 (cel3, xc1, lnum[1], Nout[1], cel0);
   FftFullSubtractor Sub2 (cel4, xc2, lnum[2], Nout[2], cel3);
   FftFullSubtractor Sub3 (OvFlow, xc3, lnum[3], Nout[3], cel4);
   assign cell = OvFlow & ~FlipA;    // Overflow detect is enabled on left shifts only
   FftMux2 Amux (cel2, {Din[15], FlipA}, cel1);
// Output multiplexer, 0-flip the data, 1-don't flip, 2-positive overflow, 3-negative overflow
   Fft4wayMux OutMux (Dout, 16'h8000, 16'h7fff, Sout,
        {Sout[0],Sout[1],Sout[2],Sout[3],Sout[4],Sout[5],Sout[6],Sout[7],Sout[8],
        Sout[9],Sout[10],Sout[11],Sout[12],Sout[13],Sout[14],Sout[15]}, {cel1, cel2});
endmodule
```

Example FFT Processor Controller

```
//*********************************************************************
// The FFT processor controller. It consists of a decoded synchronous counter with latched
// decoded outputs. These outputs control the synchronous reset of the twiddle factor
// counters. Simple logic at the output of each twiddle factor counter controls the
// Butterfly type for the associated to that counter FFT/IFFT stage and the corresponding
// switch/delay network.
module fftctrl(acA, acB, acC, AcD, acE, acF, acG, acH, tA, tB, tC, tD, tE, tF, tG, tH,
    abA, abB, abC, abD, abE, abF, abG, Pipe, Clk, Gen, Mode, EOFFT);
// Input Signals: Clk is the system clock, Gen is the global enable signal, Mode is 0 for IFFT
// and mode is 1 for FFT
    input Clk, Gen, Mode;
// Twiddle factors counters output
    output [6:0] acA, acB, acC, acD, acE, acF, acG, acH;
    reg [6:0] acA, acB, acC, acD, acE, acF, acG, acH;
// Butterfly type selects
    output   tA, tB, tC, tD, tE, tF, tG, tH, EOFFT;
// Switches controls
    output   abA, abB, abC, abD, abE, abF, abG;
    output   Pipe;       // Signal indicating the first batch of data has passed
                // through the computational pipe. In a non continuous
                // mode, indicates end of FFT/IFFT processing. In a
                // continuous mode indicates the end of first FFT/IFFT
                // processing and starts a modulo 128(for 512 points)
                // counter that will flag FFTDONE every 128th cycle
                // from that moment on.
// internal signals
    reg [9:0] CtrlCnt;      // The master control counter
    wire   CtrlCnt_0, CtrlCnt_1, CtrlCnt_2, CtrlCnt_3, CtrlCnt_4,
        CtrlCnt_5, CtrlCnt_6, CtrlCnt_7, CtrlCnt_8, CtrlCnt_9;
    wire   ClkEn;
    reg    CtrlCnt0, CtrlCnt1, CtrlCnt2, CtrlCnt3, CtrlCnt4,
        CtrlCnt5, CtrlCnt6, CtrlCnt7, CtrlCnt8, CtrlCnt9;
    wire [5:0] Ictrl;
    wire [5:0] Fctrl;
    wire   ctrlF, ctrlL, FftDone;
    wire [5:0] Decodes;
    wire   oa, ob, oc, od, oe, of, OB, OC, OD, OE, OF, OG, OH;
    wire   d0, d1, d2, d3, d4, d5;
    wire   d0rst, d1rst, d2rst, d3rst, d4rst, d5rst;
    reg    d0dly, d1dly, d2dly, d3dly, d4dly, d5dly;
    reg    ctrlLdly;
    wire   ctrlLrst;
    wire   nGen;
// wire    DctrlF, DctrlL;
// initial CtrlCnt = 0;
// State decode. The first(ctrlF=0) is for IFFT only.
    assign ctrlF = (~CtrlCnt9 & ~CtrlCnt8 & ~CtrlCnt7 & ~CtrlCnt6 & ~CtrlCnt5
        & ~CtrlCnt4 & ~CtrlCnt3 & ~CtrlCnt2 & ~CtrlCnt1 & ~CtrlCnt0);
    assign Ictrl[0] = (~CtrlCnt9 & ~CtrlCnt8 & ~CtrlCnt7 & ~CtrlCnt6 & ~CtrlCnt5
        // 2 binary
            & ~CtrlCnt4 & ~CtrlCnt3 & ~CtrlCnt2 & ~CtrlCnt1 & ~CtrlCnt0);
// 3 gray 11
    assign Ictrl[1] = (~CtrlCnt9 & ~CtrlCnt8 & ~CtrlCnt7 & ~CtrlCnt6 & ~CtrlCnt5         // 5
binary
        & ~CtrlCnt4 & ~CtrlCnt3 & ~CtrlCnt2 & ~CtrlCnt1 & ~CtrlCnt0);      // 7 gray 111
    assign Ictrl[2] = (~CtrlCnt9 & ~CtrlCnt8 & ~CtrlCnt7 & ~CtrlCnt6 & ~CtrlCnt5         // 10
binary
        & ~CtrlCnt4 & ~CtrlCnt3 & ~CtrlCnt2 & ~CtrlCnt1 & ~CtrlCnt0);      // 15 gray
1111
    assign Ictrl[3] = (~CtrlCnt9 & ~CtrlCnt8 & ~CtrlCnt7 & ~CtrlCnt6 & ~CtrlCnt5         // 19
binary
        & ~CtrlCnt4 & ~CtrlCnt3 & ~CtrlCnt2 & ~CtrlCnt1 & ~CtrlCnt0);      // 26 gray
11010
    assign Ictrl[4] = (~CtrlCnt9 & ~CtrlCnt8 & ~CtrlCnt7 & ~CtrlCnt6 & ~CtrlCnt5         // 36
binary
        & ~CtrlCnt4 & ~CtrlCnt3 & ~CtrlCnt2 & ~CtrlCnt1 & ~CtrlCnt0);      // 54 gray
110110
    assign Ictrl[5] = (~CtrlCnt9 & ~CtrlCnt8 & ~CtrlCnt7 & ~CtrlCnt6 & ~CtrlCnt5         // 69
binary
        & ~CtrlCnt4 & ~CtrlCnt3 & ~CtrlCnt2 & ~CtrlCnt1 & ~CtrlCnt0);      // 103 gray
1100111
    assign Fctrl[0] = (~CtrlCnt9 & ~CtrlCnt8 & ~CtrlCnt7 & ~CtrlCnt6 & ~CtrlCnt5         // 65
binary
        & ~CtrlCnt4 & ~CtrlCnt3 & ~CtrlCnt2 & ~CtrlCnt1 & ~CtrlCnt0);      // 97 gray
1100001
    assign Fctrl[1] = (~CtrlCnt9 & ~CtrlCnt8 & ~CtrlCnt7 & ~CtrlCnt6 & ~CtrlCnt5         // 98
binary
```

-continued

```
           & ~CtrlCnt4 & ~CtrlCnt3 & ~CtrlCnt2 & ~CtrlCnt1 & ~CtrlCnt0);      // 83 gray
1010011
   assign Fctrl[2] = (~CtrlCnt9 & ~CtrlCnt8 & ~CtrlCnt7 & ~CtrlCnt6 & ~CtrlCnt5         // 115
binary
           & ~CtrlCnt4 & ~CtrlCnt3 & ~CtrlCnt2 & ~CtrlCnt1 & ~CtrlCnt0);      // 74 gray
1001010
   assign Fctrl[3] = (~CtrlCnt9 & ~CtrlCnt8 & ~CtrlCnt7 & ~CtrlCnt6 & ~CtrlCnt5         // 124
binary
           & ~CtrlCnt4 & ~CtrlCnt3 & ~CtrlCnt2 & ~CtrlCnt1 & ~CtrlCnt0);      // 66 gray
1000010
   assign Fctrl[4] = (~CtrlCnt9 & ~CtrlCnt8 & ~CtrlCnt7 & ~CtrlCnt6 & ~CtrlCnt5         // 129
binary
           & ~CtrlCnt4 & ~CtrlCnt3 & ~CtrlCnt2 & ~CtrlCnt1 & ~CtrlCnt0);      // 193 gray
11000001
   assign Fctrl[5] = (~CtrlCnt9 & ~CtrlCnt8 & ~CtrlCnt7 & ~CtrlCnt6 & ~CtrlCnt5         // 132
binary
           & ~CtrlCnt4 & ~CtrlCnt3 & ~CtrlCnt2 & ~CtrlCnt1 & ~CtrlCnt0);      // 198 gray
11000110
// The last(ctrlL=127) state is for FFT only
   assign ctrlL = (~CtrlCnt9 & ~CtrlCnt8 & ~CtrlCnt7 & ~CtrlCnt6 & ~CtrlCnt5            // 134
binary
           & ~CtrlCnt4 & ~CtrlCnt3 & ~CtrlCnt2 & ~CtrlCnt1 & ~CtrlCnt0);      // 197 gray
11000101
// The FFT/IFFT done signal(255)
   assign FftDone = (~CtrlCnt9 & ~CtrlCnt8 & ~CtrlCnt7 & ~CtrlCnt6 & ~CtrlCnt5          //
255 binary
           & ~CtrlCnt4 & ~CtrlCnt3 & ~CtrlCnt2 & ~CtrlCnt1 & ~CtrlCnt0);      // 128 gray
10000000
   assign EOFFT = (~CtrlCnt9 & ~CtrlCnt8 & ~CtrlCnt7 & ~CtrlCnt6 & ~CtrlCnt5            // 134
binary
           & ~CtrlCnt4 & ~CtrlCnt3 & ~CtrlCnt2 & ~CtrlCnt1 & ~CtrlCnt0);
// 197 gray 11000101
// Select decode signals according to the Mode (IFFT/FFT)
   FftMux2 MD0 (Decodes[0], {Fctrl[0], Ictrl[0]}, Mode);
   FftMux2 MD1 (Decodes[1], {Fctrl[1], Ictrl[1]}, Mode);
   FftMux2 MD2 (Decodes[2], {Fctrl[2], Ictrl[2]}, Mode);
   FftMux2 MD3 (Decodes[3], {Fctrl[3], Ictrl[3]}, Mode);
   FftMux2 MD4 (Decodes[4], {Fctrl[4], Ictrl[4]}, Mode);
   FftMux2 MD5 (Decodes[5], {Fctrl[5], Ictrl[5]}, Mode);
// Butterfly types selects for both IFFT and FFT
   or (oa, acA[6], acA[5], acA[4], acA[3], acA[2], acA[1], acA[0]);
   or (ob, acB[6], acB[5], acB[4], acB[3], acB[2], acB[1]);
   or (oc, acC[6], acC[5], acC[4], acC[3], acC[2]);
   or (od, acD[6], acD[5], acD[4], acD[3]);
   or (oe, acE[6], acE[5], acE[4]);
   or (of, acF[6], acF[5]);
   or (OH, acH[6], acH[5], acH[4], acH[3], acH[2], acH[1], acH[0]);
   or (OG, acG[6], acG[5], acG[4], acG[3], acG[2], acG[1]);
   or (OF, acF[6], acF[5], acF[4], acF[3], acF[2]);
   or (OE, acE[6], acE[5], acE[4], acE[3]);
   or (OD, acD[6], acD[5], acD[4]);
   or (OC, acC[6], acC[5]);
// Select the type of butterfly and the appropriate to the stage switching from the Mode
   FftMux2 MBS0 (tA, {1'b0, oa}, Mode);
   FftMux2 MBS1 (tB, {acB[6], ob}, Mode);
   FftMux2 MBS2 (tC, {OC, oc}, Mode);
   FftMux2 MBS3 (tD, {OD, od}, Mode);
   FftMux2 MBS4 (tE, {OE, oe}, Mode);
   FftMux2 MBS5 (tF, {OF, of}, Mode);
   FftMux2 MBS6 (tG, {OG, acG[6]}, Mode);
   FftMux2 MBS7 (tH, {OH, 1'b0}, Mode);
   FftMux2 MBS8 (abA, {acA[6], acA[0]}, Mode);
   FftMux2 MBS9 (abB, {acB[5], acB[1]}, Mode);
   FftMux2 MBSA (abC, {acC[4], acC[2]}, Mode);
   assign abD = acD[3];
   FftMux2 MBSC (abE, {acE[2], acE[4]}, Mode);
   FftMux2 MBSD (abF, {acF[1], acF[5]}, Mode);
   FftMux2 MBSE (abG, {acG[0], acG[6]}, Mode);
// Derive the pipeline clock
   FftClockEnable CLKEN1 (ClkEn, Clk, Gen);
   assign Pipe = FftDone;
   not (nGen, Gen);
// Drive twiddle address counters
assign d0 = Decodes[0]; assign d1 = Decodes[1]; assign d2 = Decodes[2];
assign d3 = Decodes[3]; assign d4 = Decodes[4]; assign d5 = Decodes[5];
// assign DctrlF = ctrlF; assign DctrlL = ctrlL;
assign CtrlCnt_0 = CtrlCnt[0]; assign CtrlCnt_1 = CtrlCnt[1]; assign CtrlCnt_2 = CtrlCnt[2];
assign CtrlCnt_3 = CtrlCnt[3]; assign CtrlCnt_4 = CtrlCnt[4]; assign CtrlCnt_5 = CtrlCnt[5];
assign CtrlCnt_6 = CtrlCnt[6]; assign CtrlCnt_7 = CtrlCnt[7]; assign CtrlCnt_8 = CtrlCnt[8];
```

-continued

```
assign CtrlCnt_9 = CtrlCnt[9];
  always @(posedge Clk)
     begin
          d0dly <= d0; d1dly <= d1; d2dly <= d2; d3dly <= d3; d4dly <= d4; d5dly <= d5;
          ctrlLdly <= ctrlL;
       end
assign d1rst = (d1 & ~d1dly); assign d2rst = (d2 & ~d2dly); assign d3rst = (d3 & ~d3dly);
assign d4rst = (d4 & ~d4dly); assign d5rst = (d5 & ~d5dly); assign d0rst = (d0 & ~d0dly);
assign ctrlLrst = (ctrlL & ~ctrlLdly);
always @(/*posedge ctrlF or */posedge Clk)
     begin
       if (/*ctrlF*/Gen == 0)
          acA <= 7'b0000000;
       else
          if (ClkEn)
             acA <= acA + 1;
    end
always @(posedge d0rst or posedge Clk)
    begin
       if (d0rst)
          acB <= 7'b0000000;
       else
          if (ClkEn)
             acB <= acB + 1;
    end
always @(posedge d1rst or posedge Clk)
    begin
       if (d1rst)
          acC <= 7'b0000000;
       else
          if (ClkEn)
             acC <= acC + 1;
    end
always @(posedge d2rst or posedge Clk)
    begin
       if (d2rst)
          acD <= 7'b0000000;
       else
         if (ClkEn)
             acD <= acD + 1;
    end
always @(posedge d3rst or posedge Clk)
    begin
       if (d3rst)
          acE <= 7'b0000000;
       else
          if (ClkEn)
             acE <= acE + 1;
    end
always @(posedge d4rst or posedge Clk)
    begin
       if (d4rst)
          acF <= 7'b0000000;
       else
          if (ClkEn)
             acF <= acF + 1;
    end
always @(posedge d5rst or posedge Clk)
    begin
       if (d5rst)
          acG <= 7'b0000000;
       else
          if (ClkEn)
             acG <= acG + 1;
    end
```

```
                  -continued always @(posedge ctrlLrst or posedge Clk)
      begin
        if (ctrlLrst)
          acH <= 7'b0000000;
        else
          if (ClkEn)
            acH <= acH + 1;
      end
// Drive master control counter
    always @(posedge nGen or posedge Clk)
      begin
        if (nGen == 1)
          CtrlCnt = 0;
        else
          if (ClkEn)
            CtrlCnt = CtrlCnt + 1;
      end
// Gray counter design
    always @(posedge nGen or posedge CtrlCnt_0)
      if (nGen == 1)
        CtrlCnt0 = 0;
      else
        CtrlCnt0 = ~CtrlCnt0;
    always @(posedge nGen or posedge CtrlCnt_1)
      if (nGen == 1)
        CtrlCnt1 = 0;
      else
        CtrlCnt1 = ~CtrlCnt1;
    always @(posedge nGen or posedge CtrlCnt_2)
      if (nGen == 1)
        CtrlCnt2 = 0;
      else
        CtrlCnt2 = ~CtrlCnt2;
    always @(posedge nGen or posedge CtrlCnt_3)
      if (nGen == 1)
        CtrlCnt3 = 0;
      else
        CtrlCnt3 = ~CtrlCnt3;
    always @(posedge nGen or posedge CtrlCnt_4)
      if (nGen == 1)
        CtrlCnt4 = 0;
      else
        CtrlCnt4 = ~CtrlCnt4;
    always @(posedge nGen or posedge CtrlCnt_5)
      if (nGen == 1)
        CtrlCnt5 = 0;
      else
        CtrlCnt5 = ~CtrlCnt5;
    always @(posedge nGen or posedge CtrlCnt_6)
      if (nGen == 1)
        CtrlCnt6 = 0;
      else
        CtrlCnt6 = ~CtrlCnt6;
    always @(posedge nGen or posedge CtrlCnt_7)
      if (nGen == 1)
        CtrlCnt7 = 0;
      else
        CtrlCnt7 = ~CtrlCnt7;
    always @(posedge nGen or posedge CtrlCnt_8)
      if (nGen == 1)
        CtrlCnt8 = 0;
      else
        CtrlCnt8 = ~CtrlCnt8;
    always @(posedge nGen or posedge CtrlCnt_9)
      if (nGen == 1)
        CtrlCnt9 = 0;
      else
        CtrlCnt9 = ~CtrlCnt9;
endmodule
```

Those skilled in the art will appreciate that numerous modifications and variations may be made to the above embodiments without departing from the spirit and scope of the invention.

What is claimed is:

1. A pipelined, real-valued Fast Fourier Transform processor comprising:

a plurality of pipelined, Bergland butterfly computation units to compute a portion of a real-valued fast Fourier transform on a block of data; and interstage switch/delay modules interconnecting the plurality of Bergland butterfly computation units, the switch/delay modules reordering data for a subsequent Bergland butterfly computation unit, wherein at least one delay in the switch delay/modules is reused to reduce latency of the pipelined, real-valued Fast Fourier Transform processor.

2. The Fast Fourier Transform processor, as per claim 1, wherein the fast Fourier transform processor uses fixed point arithmetic with a hybrid floating point representation with guard bits.

3. The Fast Fourier Transform processor, as per claim 2, wherein the Bergland butterfly computational units include input and output sections to scale data according to the guard bits so as to prevent overflow conditions.

4. The Fast Fourier Transform processor, as per claim 1, wherein the fast Fourier transform processor has a RAM-type I/O.

5. The Fast Fourier Transform processor, as per claim 4, wherein data is internally accessed in the RAM type I/O as four contiguous data words.

6. A DMT engine comprising the real-valued Fast Fourier Transform processor of claim 1.

7. The DMT engine, as per claim 6, wherein the DMT engine is multiplexed between channels in a multichannel CO ADSL application.

* * * * *